United States Patent
Sasada et al.

(10) Patent No.: US 8,623,472 B2
(45) Date of Patent: Jan. 7, 2014

(54) CELLULOSE ACYLATE FILM AND METHOD FOR PRODUCING SAME, RETARDATION FILM, POLARIZING PLATE, AND LIQUID CRYSTAL DISPLAY DEVICE

(75) Inventors: Yasuyuki Sasada, Minami-Ashigara (JP); Hajime Nakayama, Minami-Ashigara (JP); Shinya Watanabe, Minami-Ashigara (JP); Kunihiro Atsumi, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 973 days.

(21) Appl. No.: 12/548,836

(22) Filed: Aug. 27, 2009

(65) Prior Publication Data

US 2010/0055354 A1  Mar. 4, 2010

(30) Foreign Application Priority Data

Aug. 28, 2008  (JP) ................. P2008-220480
Feb. 3, 2009   (JP) ................. P2009-022760

(51) Int. Cl.
    *C09K 19/00* (2006.01)
(52) U.S. Cl.
    USPC ........... 428/1.1; 428/1.3; 428/1.33; 428/141; 428/212; 349/96; 349/117; 264/291
(58) Field of Classification Search
    USPC .............. 428/1.1, 1.33, 141, 212, 532, 1.3; 349/117, 118, 120, 96; 264/291
    See application file for complete search history.

(56) References Cited

U.S. PATENT DOCUMENTS

| 5,213,852 A | 5/1993 | Arakawa et al. |
| 2002/0041352 A1* | 4/2002 | Kuzuhara et al. ............. 349/117 |
| 2009/0142516 A1* | 6/2009 | Sasada .................. 428/1.31 |

FOREIGN PATENT DOCUMENTS

| EP | 0 911 656 A2 | 4/1999 |
| JP | 5-257014 A | 10/1993 |
| JP | 9-216955 A | 8/1997 |
| JP | 2000-352620 A | 12/2000 |
| JP | 2001-100039 A | 4/2001 |
| JP | 2001-188128 A | 7/2001 |
| JP | 2005-138358 A | 6/2005 |
| JP | 2006-10863 A | 1/2006 |
| JP | 2006-52330 A | 2/2006 |
| JP | 2007-279621 A | 10/2007 |
| JP | 2008-239919 A | 10/2008 |
| WO | WO-02/46809 A1 | 6/2002 |

OTHER PUBLICATIONS

Machine English translantion of JP 09-216995, May 9, 2012.*
Japanese Office Action dated Oct. 23, 2012 issued in counterpart Japanese Application No. 2009-022760 (Partial English translation is attached).

* cited by examiner

*Primary Examiner* — Gwendolyn Blackwell
*Assistant Examiner* — Ruiyun Zhang
(74) *Attorney, Agent, or Firm* — Birch, Stewart, Kolasch & Birch, LLP

(57) ABSTRACT

A cellulose acylate film is provided and has a surface where a first in-plane orientation in a portion from 0 to 3 μm in depth from the surface is lower than a second in-plane orientation in a portion from 3 μm to 10 μm in depth from the surface.

5 Claims, No Drawings

CELLULOSE ACYLATE FILM AND METHOD FOR PRODUCING SAME, RETARDATION FILM, POLARIZING PLATE, AND LIQUID CRYSTAL DISPLAY DEVICE

This application is based on and claims priority under 35 U.S.C. §119 from Japanese Patent Application Nos. 2008-220480 and 2009-022760, filed Aug. 28, 2008 and Feb. 3, 2009, respectively, the entire disclosure of which is herein incorporated by reference.

BACKGROUND OF THE INVENTION

1. Field of the Invention

The present invention relates to a cellulose acylate film having suitably adjusted retardation and excellent adhesiveness to a polarizer and capable of being directly stuck to a polarizer, to a method for producing the cellulose acylate film, and to a retardation film using the cellulose acylate film and, further, to a highly reliable polarizing plate and a liquid crystal device using the cellulose acylate film.

2. Description of Related Art

A polymer film of typically cellulose ester, polyester, polycarbonate, cyclo-olefin polymer, vinyl polymer or polyimide is used in silver halide photographic materials, retardation films, polarizing plates, and image display devices. Films that are more excellent in the point of the surface smoothness and the uniformity can be produced from these polymers, and the polymers are therefore widely employed for optical films.

Of these, cellulose acylate films having suitable moisture permeability can be directly stuck to the most popular polarizers formed of polyvinyl alcohol (PVA)/iodine in on-line operation. Accordingly, especially cellulose acetate is widely employed as a protective film for polarizing plates, and methods for producing it have been variously investigated (see, for example, JP-A-2001-188128 and JP-A-2000-352620).

In the case of applying a cellulose acylate film to optical use, for example, in retardation films, supports for retardation films, protective films for polarizing plates, and liquid crystal display devices, the control of adhesiveness of the cellulose acylate film to other member is an important factor which determines the reliability of display devices. For example, in the case of applying a cellulose acylate film to use in a protective film for a polarizing plate, inadequate adhesiveness to the polarizer might lead to serious reduction in polarizing degree or separation of the polarizer from the protective film under some using conditions. As a result, there results deterioration of the performance of the polarizing plate and, in the case of using it in liquid crystal display devices, there results deterioration of image quality.

On the other hand, with the late-year demand to enlarge a viewing angle of a liquid crystal display device, improvement of compensation performance of retardation has been increasingly required. At the same time, it has also been required to produce retardation films at a low production cost. Control of such retardation has in many cases been achieved by, for example, adjustment of materials, adjustment of film-forming method, or operation of stretching film (see, for example, European Patent No. 0911656, JP-A-5-257014, JP-A-2005-138358, and JP-A-9-216955).

Also, with respect to relation between the film and the polarizer, various investigations have so far been made to improve adhesiveness between them. However, methods in the related art are failing to provide sufficient adhesiveness, and more improvement has been demanded (see, for example, JP-A-9-216955, WO 02/046809, JP-A-2007-279621.

However, it has become apparent that, when a cellulose acylate film with a retardation having been adjusted by the operation of stretching or the like is produced, the resulting film tends to suffer formation of cracks or, when such a film is stuck to a polarizer to prepare a polarizing plate, there results a deteriorated adhesiveness to the polarizer. As a problem with adhesiveness of the polarizing plate, there has been known formation of cracks or peeling upon cutting or punching the polarizing plate. Additionally, this problem has been reported with polarizing plate using non-stretched cellulose acylate film, but such a problem has become non-problematical at the present technical level of the processing. However, when a polarizing plate is used by using a cellulose acylate film with retardation having been adjusted by the operation of stretching or the like, phenomena different from the adhesion problem in the related art have appeared. In some cases, sticking failure occurs when sticking the polarizing plate to a liquid crystal cell via an adhesive or the like. In such cases, in order to re-use the expensive liquid crystal cell, it is necessary to completely delaminate the polarizing plate from the liquid crystal cell. However, there arises the problem that the polarizing plate with insufficient adhesion suffers tearing upon delaminating operation, thus the polarizing plate remaining on the liquid crystal cell.

On the other hand, with polarizing plates using non-stretched cellulose acylate film, it has been reported that the problems such as formation of cracks or delamination in the step of cutting or punching the polarizing plate have been solved by applying a solvent to the film to thereby reduce out-of-plane orientation to a depth of about 10 μm from the surface. However, it has become apparent that, when such a method is applied as it is to a stretched cellulose acylate film, not only the out-of-plane orientation but the in-plane orientation is reduced as well, leading to large change in retardation.

SUMMARY OF THE INVENTION

An object of the invention is to provide a method of producing cellulose acylate film having adjusted retardation and adequate adhesiveness to polarizers by using a cellulose acylate film.

As a result of intensive investigations, the inventors have found that the tearing in the polarizing plate using the aforesaid cellulose acylate film is caused by breakage of the cellulose acylate film in the vicinity of the interface between the cellulose acylate film and the polarizer, and that the problems in the related-art can be solved by contacting the surface of the cellulose acylate film having adjusted retardation with an organic solvent, and drying the film to reduce the amount of the organic solvent. That is, as a means for solving the problems, the following invention can be achieved and provided.

[1] A cellulose acylate film having a surface, wherein a first in-plane orientation in a portion from 0 to 3 μm in depth from the surface is lower than a second in-plane orientation in a portion from 3 μm to 10 μm in depth from the surface.

[2] The cellulose acylate film according to [1], wherein the surface has a surface roughness of 5 to 300 nm.

[3] The cellulose acylate film according to [1] or [2], satisfying formulae (I) and (II):

$$30 \leq Re \leq 85 \quad \text{Formula (I)}$$

$$80 \leq Rth \leq 300 \quad \text{Formula (II)}$$

wherein Re represents an in-plane retardation value in nm, and Rth represents a thickness-direction retardation.

[4] A retardation film comprising at least one cellulose acylate film according to any one of [1] to [3].

[5] A polarizing plate comprising at least one cellulose acylate film according to any one of [1] to [3] or retardation film according to [4].

[6] A liquid crystal display device comprising at least one cellulose acylate film according to any one of [1] to [3], retardation film according to [4], or polarizing plate according to [5].

[7] A method for producing a cellulose acylate film, comprising the steps of: a step of stretching a cellulose acylate film; a step of contacting the cellulose acylate film with an organic solvent; and a step of drying the cellulose acylate film to reduce an amount of the organic solvent.

[8] The method for producing a cellulose acylate film according to [7], wherein the organic solvent contains as a main solvent a solvent selected from the group consisting of a ketone, an ester, and a halogenated hydrocarbon.

[9] The method for producing a cellulose acylate film according to [7] or [8], wherein an amount of a residual solvent in the cellulose acylate film before being contacted with the organic solvent is from 0 to 10% by weight.

[10] The method for producing a cellulose acylate film according to any one of [7] to [9], wherein the stretching of the cellulose acylate film includes dry-stretching the cellulose acylate film in which an amount of a residual solvent is from 0 to 5% by weight.

[11] The method for producing a cellulose acylate film according to any one of [7] to [10], satisfying a ratio $W_1/W_0$ of 0.97 to 1.03, wherein $W_1$ represents a weight of the cellulose acylate film after being dried, and $W_0$ represents a weight of the cellulose acylate film before being contacted with the organic solvent.

[12] The method for producing a cellulose acylate film according to any one of [7] to [11], wherein the cellulose acylate film is formed by a method including:

casting a mixture, in which cellulose acylate is dissolved, onto a support kept at a temperature of −30 to 10° C.;

peeling the mixture as a web in such a state that an amount of a residual solvent in the mixture is from 101 to 400% by weight from the support; and holding the peeled web with a tenter.

Further, other aspects of the invention are described below.

[13] The cellulose acylate film according to any one of [1] to [3], which contains a retardation increasing agent in a content of from 0.01 to 15% by weight.

[14] The cellulose acylate film according to any one of [1] to [3] or [13], wherein an acyl substitution degree of acyl groups substituting for hydroxyl groups of cellulose is from 2.00 to 3.00.

[15] The cellulose acylate film according to any one of [1] to [3], [13] or [14], wherein an acyl substitution degree of acyl groups containing 3 or more carbon atoms and substituting for hydroxyl groups of cellulose is from 0 to 2.00.

[16] The method for producing a cellulose acylate film according to [7], wherein the organic solvent contains as a main solvent a good solvent for the cellulose acylate film.

[17] The method for producing a cellulose acylate film according to any one of [7] to [12] or [16], wherein the concentration of the organic solvent is higher than the solvent concentration of the cellulose acylate film before being contacted with the organic solvent.

[18] The method for producing a cellulose acylate film according to any one of [7] to [12] or [17], wherein the cellulose acylate film before being contacted with the organic solvent is a stretched cellulose acylate film.

[19] The method for producing a cellulose acylate film according to [18], wherein the stretched cellulose acylate film is a cellulose acylate film having been stretched under such a condition that the amount of a residual solvent in the film is from 0 to 10% by weight.

[20] The method for producing a cellulose acylate film according to any one of [7] to [12], or [16] to [19], wherein the step of contacting the cellulose acylate film with the organic solvent includes a step of applying the organic solvent to the cellulose acylate film.

[21] The method for producing cellulose acylate film according to any one of [7] to [12], or [16] to [20], wherein the step of contacting the cellulose acylate film with the organic solvent is performed while conveying the film.

[22] The method for producing a cellulose acylate film according to any one of [7] to [12], or [16] to [21], wherein the ratio of the retardation ($Re_1$) of the cellulose acylate film after the drying step to the retardation ($Re_0$) of the cellulose acylate film before being contacted with the organic solvent, $Re_1/Re_0$, is from 0.8 to 1.2.

[23] The method for producing a cellulose acylate film according to any one of [7] to [12], or [16] to [22], wherein the ratio of the haze ($HZ_1$) of the cellulose acylate film after the drying step to the haze ($HZ_0$) of the cellulose acylate film before being contacted with the organic solvent, $HZ_1/HZ_0$, is from 0.1 to 1.5.

[24] The method for producing a cellulose acylate film according to any one of [7] to [12], or [16] to [23], wherein the haze ($HZ_1$) of the cellulose acylate film after the drying step is 1.0% or less than that.

[25] The polarizing plate according to [5], wherein the cellulose acylate film is directly stuck to the polarizer.

[26] The polarizing plate according to [5] or [25], wherein the organic solvent-contacted surface of the cellulose acylate film is the surface stuck to the polarizer.

DETAILED DESCRIPTION OF THE EXEMPLARY EMBODIMENTS

A cellulose acylate film according to an exemplary embodiment of the present invention has an adequately adjusted retardation and has an adequate adhesiveness to a polarizer. Also, a retardation film, polarizing plate, and liquid crystal display device produced by using the cellulose acylate film show excellent reliability.

Exemplary embodiments of the present invention, including a method for producing a cellulose acylate film and the like, are described in detail below. Although descriptions on the constituent features will be in some cases based on exemplary embodiments of the invention, the invention is not limited by such embodiments. Additionally, in this specification, the numerical range represented by "from  to " means the range including the numerical values set forth before and after "to" as lower and upper limits, respectively.

<<Cellulose Acylate Film>>

A cellulose acylate film according to an exemplary embodiment of the invention is characterized in that, in at least one surface of the film, the in-plane orientation of the portion from 0 to 3 μm in depth from the surface is less than the in-plane orientation in the portion from 3 to 10 μm in depth from the surface.

When the in-plane orientations in both the surfaces of the film are considered, the surface roughness of one surface having lower in-plane orientation than the other surface is preferably from 5 to 300 nm.

Also, the cellulose acylate film of the invention preferably satisfies the following formulae (I) and (II):

$$30 \leq Re \leq 85 \qquad \text{Formula (I)}$$

$$80 \leq Rth \leq 300 \qquad \text{Formula (II)}$$

wherein Re and Rth represent a retardation value in the in-plane direction (in-plane retardation) and a retardation value in the film thickness direction (thickness-direction retardation), respectively (unit: nm).

<<Method for Producing Cellulose Acylate Film>>

A method for producing cellulose acylate film according to an exemplary embodiment of the invention includes a step of stretching a cellulose acylate film, a step of contacting the film with an organic solvent, and a step of drying the film to reduce the amount of the organic solvent.

[Cellulose Acylate]

First, a cellulose acylate film and cellulose acylate capable of being used for the method of producing the cellulose acylate film are described below.

A cellulose acylate film to be contacted with an organic solvent in the production method of the invention is a film in which cellulose acylate is the major component polymer constituting the film. The "major component polymer" as referred to herein is meant to indicate the polymer itself when the film is formed of a single polymer and, when the film is formed of different polymers, then it indicates the polymer having the highest weight fraction of all the polymers constituting the film.

Cellulose acylate is an ester of cellulose with a carboxylic acid. In the cellulose acylate, all or a part of the hydrogen atoms of the hydroxyl groups existing at the 2-, 3- and 6-positions of the glucose unit constituting the cellulose are substituted with an acyl group. The acyl group contains preferably from 2 to 22 carbon atoms, more preferably from 2 to 4 carbon atoms. Examples of the acyl group include acetyl, propionyl, butyryl, isobutyryl, pivaloyl, heptanoyl, hexanoyl, octanoyl, decanoyl, dodecanoyl, tridecanoyl, tetradecanoyl, hexadecanoyl, octadecanoyl, cyclohexanecarbonyl, oleoyl, benzoyl, naphthylcarbonyl, and cinnamoyl. The acyl group is preferably acetyl, propionyl, butyryl, dodecanoyl, octadecanoyl, pivaloyl, oleoyl, benzoyl, naphthylcarbonyl, and cinnamoyl, and acetyl, propionyl, and butyryl is most preferred.

The cellulose acylate may be an ester of cellulose with plural kinds of carboxylic acids. Namely, the cellulose acylate may be substituted with plural kinds of acyl groups.

Among them, preferred cellulose acylates are the following materials. That is, an intrinsic birefringence can be increased to thereby improve expression of retardation by decreasing the value of SA+SB, while the film-forming speed can be increased by increasing the value of SA+SB, wherein SA and SB represent a substitution degree of acetyl group (containing 2 carbon atoms) and a substitution degree of acyl group having 3 or more carbon atoms which are substituted for hydroxyl group of cellulose, respectively. Accordingly, the range of the value of SA+SB is preferably $2.00 \leq SA+SB \leq 3.00$, more preferably $2.30 \leq SA+SB \leq 2.90$, still more preferably $2.40 \leq SA+SB \leq 2.85$, yet more preferably $2.60 \leq SA+SB \leq 2.83$, particularly preferably $2.70 \leq SA+SB \leq 2.81$. Additionally, in the case of positively using crystals of cellulose acylate to control retardation, the range of the value of SA+SB is more preferably $2.75 \leq SA+SB \leq 3.00$, still more preferably $2.80 \leq SA+SB \leq 2.99$, yet more preferably $2.85 \leq SA+SB \leq 2.98$, particularly preferably $2.87 \leq SA+SB \leq 2.98$.

Also, humidity dependency of the retardation of the cellulose acylate film produced by the production method of the invention can be adjusted by adjusting SB. The film-forming speed can be increased by decreasing SB, whereas the humidity dependency of retardation can be reduced by increasing SB. Therefore, the range of SB is preferably $0 < SB \leq 2.0$, more preferably $0.1 < SB \leq 1.0$, still more preferably $0.2 < SB \leq 0.7$. Additionally, when all of the hydroxyl groups of cellulose are substituted, the above-described substitution degree amounts to 3.

The cellulose acylate can be synthesized by known methods. For example, regarding a method for producing cellulose acylate, its basic principle is described in *Mokuzai Kagaku* (Wood Chemistry) by Nobuhiko Migita et al., pp. 180-190 (Kyoritsu Publishing, 1968). One typical method for producing cellulose acylate is a liquid-phase acylation method using a carboxylic acid anhydride-carboxylic acid-sulfuric acid catalyst. Specifically, a starting material for cellulose such as cotton linter or woody pulp is pretreated with a suitable amount of a carboxylic acid such as acetic acid, and then put into a previously-cooled acylation mixture for esterification to produce a complete cellulose acylate (in which the overall substitution degree of acyl group in the 2-, 3- and 6-positions is nearly 3.00). The acylation mixture generally includes a carboxylic acid serving as a solvent, a carboxylic acid anhydride serving as an esterifying agent, and sulfuric acid serving as a catalyst. In general, the amount of the carboxylic acid anhydride to be used in the method is stoichiometrically excessive over the overall amount of water existing in the cellulose that reacts with the anhydride and water existing in the system.

Next, after completion of the acylation, in order to hydrolyze the excessive carboxylic acid anhydride still remaining in the system, water or water-containing acetic acid is added to the system. Then, for partially neutralizing the esterification catalyst, an aqueous solution that contains a neutralizing agent (e.g., carbonate, acetate, hydroxide or oxide of calcium, magnesium, iron, aluminium or zinc) may be added thereto. Then, the resulting complete cellulose acylate is saponified and ripened by keeping it at 20 to 90° C. in the presence of a small amount of an acylation catalyst (generally, sulfuric acid remaining in the system), thereby converting it into a cellulose acylate having a desired substitution degree of acyl group and a desired polymerization degree. At the time when the desired cellulose acylate is obtained, the catalyst still remaining in the system is completely neutralized with the above-mentioned neutralizing agent; or the catalyst therein is not neutralized, and the cellulose acylate solution is put into water or diluted acetic acid (or water or diluted acetic acid is put into the cellulose acylate solution) to thereby separate the cellulose acylate, and thereafter this is washed and stabilized to obtain the intended product, cellulose acylate.

The polymerization degree of the cellulose acylate is preferably from 150 to 500 in terms of the viscosity-average polymerization degree, more preferably from 200 to 400, still more preferably from 220 to 350. The viscosity-average polymerization degree may be measured according to a limiting viscosity method by Uda et al. (Kazuo Uda, Hideo Saito; *Journal of the Fiber Society of Japan*, Vol. 18, No. 1, pp. 105-120, 1962). The method for measuring the viscosity-average polymerization degree is described also in JP-A-9-95538.

Cellulose acylate wherein the amount of low-molecular components is small has a high average molecular weight (high polymerization degree), but its viscosity is lower than that of ordinary cellulose acylate. Such cellulose acylate wherein the amount of low-molecular components is small may be obtained by removing low-molecular components from cellulose acylate produced in an ordinary method. The removal of low-molecular components may be attained by washing cellulose acylate with a suitable organic solvent. Cellulose acylate wherein the amount of low-molecular components is small may also be obtained by synthesizing it. In the case where cellulose acylate wherein the amount of low-molecular components is small is synthesized, it is desirable that the amount of the sulfuric acid catalyst in acylation reaction is controlled to be from 0.5 to 25 parts by weight par 100 parts by weight of cellulose. When the amount of the sulfuric acid catalyst is controlled to fall within the range, cellulose acylate having a preferable molecular weight distribution (uniform molecular weight distribution) can be produced. The polymerization degree and the molecular weight distribution of cellulose acylate can be measured by gel permeation chromatography (GPC) or the like.

The starting material cotton for cellulose ester and methods for producing it are described also in *Hatsumei Kyokai Disclosure Bulletin* (No. 2001-1745, issued Mar. 15, 2001, Hatsumei Kyokai), pp. 7-12.

As cellulose acylate to be used as a starting material for producing the cellulose acylate film, powdery or particulate cellulose acylate can be used, with pelletized one being also usable. The water content of cellulose acylate upon being used as a starting material is preferably 1.0% by weight or less, more preferably 0.7% by weight or less, most preferably 0.5% by weight or less. In some cases, the water content of cellulose acylate is preferably 0.2% by weight or less. In the case where the water content of cellulose acylate is not within the preferred range, cellulose acylate is preferably dried by air-drying or by heating before use.

In producing the cellulose acylate film, either a single polymer or plural kinds of polymers may be used.

[Cellulose Acylate Solution]

A cellulose acylate film to be used for the production method of the invention (hereinafter also referred to as "cellulose acylate film before being contacted with an organic solvent") may be produced, for example, from a cellulose acylate solution that contains the cellulose acylate and various additives, according to a method of solution casting film formation. A cellulose acylate solution which can be used for the method of solution casting film formation will be described below.

(Solvent)

As a main solvent in the cellulose acylate solution to be used for the production method of the invention, an organic solvent that is a good solvent for the polymer can preferably be used. In the invention, the good solvent for the cellulose acylate means a solvent that can bring the cellulose acylate into a state of a transparent or semi-transparent solution and is a solvent that can dissolve or swell the cellulose acylate at a room temperature. As such organic solvent, those organic solvents are preferred which have a boiling point of not higher than 80° C., from the viewpoint of reducing the drying load. More preferably, the organic solvent has a boiling point of from 10 to 80° C., particularly preferably from 20 to 60° C. In some cases, an organic solvent having a boiling point of from 30 to 45° C. may also be preferably used as the main solvent.

As such main solvent, halogenated hydrocarbons can particularly preferably be illustrated. In some cases, esters, ketones, ethers, alcohols, and hydrocarbons can be illustrated, which may have a branched structure or a cyclic structure. The main solvent may have two or more functional groups of any of esters, ketones, ethers, and alcohols (i.e., —COO—, —CO—, —O—, —OH). Further, the hydrogen atoms in the hydrocarbon part of these esters, ketones, ethers, and alcohols may be substituted with a halogen atom (especially, fluorine atom). Regarding the main solvent of the cellulose acylate solution to be used in producing the cellulose acylate film of the invention, when the solvent of the solution is a single solvent, then it is the main solvent but, when the solvent comprises plural kinds of solvents, then the main solvent is the solvent having the highest weight fraction of all the constitutive solvents. As the main solvent, halogenated hydrocarbons can preferably be illustrated.

The halogenated hydrocarbons are more preferably chlorinated hydrocarbons, and examples thereof include dichloromethane and chloroform, with dichloromethane being more preferred.

The ester includes, for example, methyl formate, ethyl formate, methyl acetate, and ethyl acetate.

The ketone includes, for example, acetone, and methyl ethyl ketone.

The ether includes, for example, diethyl ether, methyl tert-butyl ether, diisopropyl ether, dimethoxymethane, 1,3-dioxolan, 4-methyldioxolan, tetrahydrofuran, methyltetrahydrofuran, and 1,4-dioxane.

The alcohol includes, for example, methanol, ethanol, and 2-propanol.

The hydrocarbon includes, for example, n-pentane, cyclohexane, n-hexane, benzene, and toluene.

The organic solvent that may be used together with the main solvent includes halogenated hydrocarbons, esters, ketones, ethers, alcohols and hydrocarbons, which may have a branched structure or a cyclic structure. The organic solvent may have two or more functional groups of any of esters, ketones, ethers, and alcohols (i.e., —O—, —CO—, —COO—, —OH). Further, the hydrogen atoms in the hydrocarbon part of these esters, ketones, ethers, and alcohols may be substituted with a halogen atom (especially, fluorine atom).

The halogenated hydrocarbon is preferably a chlorinated hydrocarbon, including dichloromethane and chloroform, with dichloromethane being more preferred.

The ester includes, for example, methyl formate, ethyl formate, propyl formate, pentyl formate, methyl acetate, ethyl acetate, and pentyl acetate.

The ketone includes, for example, acetone, methyl ethyl ketone, diethyl ketone, diisobutyl ketone, cyclopentanone, cyclohexanone, and methylcyclohexanone.

The ether includes, for example, diethyl ether, methyl tert-butyl ether, diisopropyl ether, dimethoxymethane, dimethoxyethane, 1,4-dioxane, 1,3-dioxolan, 4-methyldioxolan, tetrahydrofuran, methyltetrahydrofuran, anisole, and phenetole.

The alcohol includes, for example, methanol, ethanol, 1-propanol, 2-propanol, 1-butanol, 2-butanol, tert-butanol, 1-pentanol, 2-methyl-2-butanol, cyclohexanol, 2-fluoroethanol, 2,2,2-trifluoroethanol, and 2,2,3,3-tetrafluoro-1-propanol. The alcohol is preferably an alcohol containing from 1 to 4 carbon atoms, more preferably methanol, ethanol or butanol, most preferably methanol or butanol. The hydrocarbon includes, for example, n-pentane, cyclohexane, n-hexane, benzene, toluene, and xylene.

The organic solvent having two or more different kinds of functional groups includes, for example, 2-ethoxyethyl acetate, 2-methoxyethanol, 2-butoxyethanol, and methyl acetacetate.

The polymer constituting the cellulose acylate film of the invention contains hydrogen-binding functional groups such as a hydroxyl group or an ester group, and hence it is desirable that the total solvent for the polymer contains from 5% to 30% by weight, more preferably from 7% to 25% by weight, still more preferably from 10% to 20% by weight of alcohol from the viewpoint of improving solubility and film-forming speed and reducing the load for peeling film from casting support.

Also, the cellulose acylate solution to be used for preparing the cellulose acylate film which is used for the production method of the invention contains an organic solvent in a content of from 1 to 15% by weight, more preferably from 1.5 to 13% by weight, still more preferably from 2 to 10% by weight, that solvent evaporates in a small proportion together with the halogenated hydrocarbon in the initial drying stage, is gradually concentrated, has a boiling point of 95° C. or more, and is a poor solvent for cellulose ester. In addition, in the invention, incorporation of a small amount of water is effective for enhancing viscosity of the solution or film strength of a wet film upon drying, and for enhancing dope strength upon casting according to the drum casting method. For example, water may be incorporated in a content of from 0.1 to 5% by weight, more preferably from 0.1 to 3% by weight, particularly preferably from 0.2 to 2% by weight, based on the total weight of the solution.

Preferred examples of the combination of organic solvents for use as the solvent in the cellulose acylate solution to be used in preparing the cellulose acylate film which is used for the production method of the invention are mentioned below, to which, however, the invention should not be limited, The numerical values of ratio are parts by weight.

(1) Dichloromethane/methanol/ethanol/butanol=80/10/5/5
(2) Dichloromethane/methanol/ethanol/butanol=80/5/5/10
(3) Dichloromethane/isobutyl alcohol=90/10
(4) Dichloromethane/acetone/methanol/propanol=80/5/5/10
(5) Dichloromethane/methanol/butanol/cyclohexane=80/8/10/2
(6) Dichloromethane/methyl ethyl ketone/methanol/butanol=80/10/5/5
(7) Dichloromethane/butanol=90/10
(8) Dichloromethane/acetone/methyl ethyl ketone/ethanol/butanol=68/10/10/7/5
(9) Dichloromethane/cyclopentanone/methanol/pentanol=80/2/15/3
(10) Dichloromethane/methyl acetate/ethanol/butanol=70/12/15/3
(11) Dichloromethane/methyl ethyl ketone/methanol/butanol 80/5/5/10
(12) Dichloromethane/methyl ethyl ketone/acetone/methanol/pentanol=50/20/15/5/10
(13) Dichloromethane/1,3-dioxolan/methanol/butanol=70/15/5/10
(14) Dichloromethane/dioxane/acetone/methanol/butanol=75/5/10/5/5
(15) Dichloromethane/acetone/cyclopentanone/ethanol/isobutyl alcohol/cyclohexanone=60/18/3/10/7/2
(16) Dichloromethane/methyl ethyl ketone/acetone/isobutyl alcohol=70/10/10/10
(17) Dichloromethane/acetone/ethyl acetate/butanol/hexane=69/10/10/10/1
(18) Dichloromethane/methyl acetate/methanol/isobutyl alcohol=65/15/10/10
(19) Dichloromethane/cyclopentanone/ethanol/butanol=85/7/3/5
(20) Dichloromethane/methanol/butanol=83/15/2
(21) Dichloromethane=100
(22) Acetone/ethanol/butanol=80/15/5
(23) Methyl acetate/acetone/methanol/butanol=75/10/10/5
(24) 1,3-dioxolan=100
(25) Dichloromethane/methanol/butanol/water=85/18/1.5/0.5
(26) Dichloromethane/acetone/methanol/butanol/water=87/5/5/2.5/0.5
(27) Dichloromethane/methanol=92/8
(28) Dichloromethane/methanol=90/10
(29) Dichloromethane/methanol=87/13
(30) Dichloromethane/ethanol=90/10

Also, in some cases, a non-halogen organic solvent may be the main solvent, and detailed descriptions thereof are given in *Hatsumei Kyokai Disclosure Bulletin* (No. 2001-1745, issued Mar. 15, 2001, Hatsumei Kyokai).

(Solution Concentration)

The cellulose acylate concentration in the cellulose acylate solution to be prepared herein is preferably from 5 to 40% by weight, more preferably from 10 to 30% by weight, most preferably from 15 to 30% by weight.

The cellulose acylate concentration may be so controlled that it can be a predetermined concentration in the stage where cellulose acylate is dissolved in a solvent. Also, a solution having a low concentration (e.g., from 4 to 14% by weight) may be previously prepared, followed by concentrating the solution by evaporating the solvent from it. Further, a solution having a high concentration may be previously prepared, followed by diluting the solution. The cellulose acylate concentration in the solution may also be reduced by adding an additive thereto.

(Additive)

The polymer solution to be used for preparing the polymer film which is to be used for the production method of the invention may contain various liquid or solid additives in accordance with the use of the film, in each of the preparation steps. Examples of the additives to be preferably used for the cellulose acylate film of the invention are additives having a molecular weight of 10,000 or less, which can be properly used for reducing humidity dependency of retardation or for adjusting expression of retardation or balancing Re with Rth. Particularly, in the case of intending to increase the Rth/Re value, the additive having a molecular weight of 10,000 or less is preferably a compound having one or more aromatic rings. Examples of the additives include a plasticizer (its preferred amount is from 0.01 to 30% by weight of the polymer; the same shall apply hereunder), a UV absorbent (0.001 to 1% by weight), powdery particles having an average particle size of from 5 to 3000 nm (0.001 to 1% by weight), a fluorine-containing surfactant (0.001 to 1% by weight), a release agent (0.0001 to 1% by weight), a deterioration-preventing agent (0.0001 to 1% by weight), an optical anisotropy-controlling agent (0.01 to 10% by weight), and an IR absorbent (0.001 to 1% by weight).

The optical anisotropy-controlling agents are compounds having a molecular weight of 10,000 or less and preferably having both a hydrophobic part and a hydrophilic part. These compounds are aligned between the polymer chains, thereby changing the retardation value of the film. When the compounds are combined with cellulose acylate that is especially preferably used in the invention, the compounds may improve the hydrophobicity of the film and may reduce the humidity-dependent change of the retardation thereof. In addition, when the compounds are combined with the UV absorbent or IR absorbent, the compounds may effectively control the wavelength dependency of the retardation of the film. The additives to be used in the cellulose acylate film of the invention are preferably those not substantially evaporating in the step of drying.

From the viewpoint of reducing the humidity-dependent retardation change of the film, the amount of these additives to be added to the film is preferably larger, but with the increase in the amount to be added, there may occur some problems that the glass transition temperature (Tg) of the polymer film may lower and that the additives may evaporate away during the process of film production. Accordingly, in the case where cellulose acetate to be preferably used in the invention is used as the polymer, the amount of the additive having the molecular weight of 10,000 or less is preferably 30% by weight or less, more preferably in the range of from 0.1 to 30% by weight, still more preferably in the range of from 2 to 20% by weight based on the cellulose acylate.

Specifically, from the viewpoint of increasing the Rth/Re value, the additive is preferably a compound having one or more aromatic rings, more preferably a compound having from 2 to 15 aromatic rings, still more preferably a compound having from 3 to 10 aromatic rings. Each of other atoms than those constituting the aromatic rings of the compound is preferably positioned in approximately the same plane as that of the aromatic ring and, in the case where the compound has plural aromatic rings, each of the aromatic rings is also preferably positioned in approximately the same plane as that of other aromatic ring. Also, in order to selectively increase Rth, the additive is preferably present in the film in such manner that the plane of the aromatic rings is in parallel with the film plane.

The additives may be used independently or in combination of two or more thereof.

As to the additives which can be suitably used in the invention for cellulose acylate, there are descriptions in JP-A-2005-104148. Also, as an optical anisotropy-controlling agent (retardation increasing agent) capable of exhibiting the effect of increasing the Rth/Re value, there can be illustrated a plasticizer described in JP-A-2005-104148 on pages 33 to 34, and an optical anisotropy-controlling agent described in JP-A-2005-104148 on pages 38 to 89. Further, as the IR absorbent, description is given in JP-A-2001-194522. The time of adding the additives may properly be determined depending on the kinds of the additives.

Also, in the invention, the following high molecular plasticizers may preferably be used as well.

The high molecular plasticizer in the invention is characterized by containing a repeating unit segment within the compound. The high molecular plasticizer of the invention has a number-average molecular weight of from 500 to 10,000, preferably from 600 to 3,000, still more preferably from 700 to 2,500, particularly preferably from 700 to 2,000. However, the high molecular plasticizer in the invention is not limited to only those compounds which have a repeating unit segment, but may be a mixture with a compound having no repeating units.

The high molecular plasticizer of the invention may be liquid or solid at the environment temperature or humidity at which it is used (in general, at room temperature or, that is, at 25° C. and relative humidity of 60%). Preferably, its color is as light as possible, and particularly preferably, it is colorless. Preferably, it is thermally stable at higher temperatures, and more preferably its decomposition starting temperature is 150° C. or higher, still more preferably 200° C. or higher. The high molecular plasticizer for use in the invention is described in detail hereunder with reference to its specific examples, to which, however, the polymer plasticizer for use in the invention should not be limited.

(Kinds of High Molecular Plasticizer)

The high molecular plasticizer for use in the polymer film of the invention is not particularly limited, but is preferably at least one plasticizer having a number-average molecular weight of at least 500 and selected from polyester plasticizers, polyether plasticizers, polyurethane plasticizers, polyester polyurethane plasticizers, polyester polyether plasticizers, polyether polyurethane plasticizers, polyamide plasticizers, polysulfone plasticizers, polysulfonamide plasticizers, and other high molecular plasticizers mentioned below.

More preferably, at least one of them is a polyester plasticizer, a polyether plasticizer, a polyurethane plasticizer, a polyester polyurethane plasticizer, a polyester polyether plasticizer, a polyether polyurethane plasticizer, a polyamide plasticizer, a polysulfone plasticizer or a polysulfonamide plasticizer, particularly preferably a polyester plasticizer, a polyester polyurethane plasticizer or a polyester polyether plasticizer. Preferred high molecular plasticizers to be preferably used in the invention are described below according to their kinds.

(Polyester Plasticizer)

First, the polyester plasticizer for use in the invention is described. Though not particularly limited, the polyester plasticizer preferred is one produced through reaction between a dicarboxylic acid and a glycol, and both ends of the reaction product may be as such, or may be blocked by further reaction with a monocarboxylic acid or a monoalcohol. The terminal blocking may be effected for the reason that the absence of a free carboxylic acid in the plasticizer is effective for the storability of the plasticizer. The dicarboxylic acid for the polyester plasticizer of the invention is preferably an aliphatic dicarboxylic acid having from 4 to 12 carbon atoms or an aromatic dicarboxylic acid having from 8 to 12 carbon atoms.

The alkylenedicarboxylic acid component having from 4 to 12 carbon atoms for the polyester plasticizer to be preferably used in the invention includes, for example, succinic acid, maleic acid, fumaric acid, glutaric acid, adipic acid, azelaic acid, sebacic acid, dodecanedicarboxylic acid, and 1,4-cyclohexanedicarboxylic acid. The arylenedicarboxylic acid component having from 8 to 12 carbon atoms includes phthalic acid, terephthalic acid, 1,5-naphthalenedicarboxylic acid, and 1,4-naphthalenedicarboxylic acid. These may be used singly or as a mixture of two or more thereof. Next, the glycol to be utilized for the polyester plasticizer is described. It includes an aliphatic or alicyclic glycol having from 2 to 12 carbon atoms, and an aromatic glycol having from 6 to 12 carbon atoms.

The aliphatic glycol and the alicyclic glycol having from 2 to 12 carbon atoms include ethylene glycol, 1,2-propylene glycol, 1,3-propylene glycol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylolheptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, and 1,12-octadecanediol. These glycols may be used singly or as a mixture of two or more thereof.

Preferably, the polyester plasticizer of the invention is protected with a monoalcohol residue or a monocarboxylic acid residue in order that both ends of the polyester plasticizer are not a carboxylic acid. In this case, the monoalcohol residue is preferably a substituted or unsubstituted monoalcohol residue having from 1 to 30 carbon atoms including, for example, aliphatic alcohols such as methanol, ethanol, propanol, isopropanol, butanol, isobutanol, pentanol, isopentanol, hexanol, isohexanol, cyclohexyl alcohol, octanol, isooctanol, 2-ethylhexyl alcohol, nonyl alcohol, isononyl alcohol, tert-nonyl alcohol, decanol, dodecanol, dodecahexanol, dodecaoctanol, allyl alcohol, and oleyl alcohol; and substituted alcohols such as benzyl alcohol and 3-phenylpropanol.

Those alcohol residues for terminal blocking which can preferably be used are methanol, ethanol, propanol, isopropanol, butanol, isobutanol, isopentanol, hexanol, isohexanol, cyclohexyl alcohol, isooctanol, 2-ethylhexyl alcohol, isononyl alcohol, oleyl alcohol, and benzyl alcohol, with methanol, ethanol, propanol, isobutanol, cyclohexyl alcohol, 2-ethylhexyl alcohol, isononyl alcohol, and benzyl alcohol being particularly preferred.

In blocking with a monocarboxylic acid residue, the monocarboxylic acid for use as the monocarboxylic acid residue is preferably a substituted or unsubstituted monocarboxylic acid having from 1 to 30 carbon atoms. It may be an aliphatic monocarboxylic acid or an aromatic monocarboxylic acid. First, preferred aliphatic monocarboxylic acids are described. They include acetic acid, propionic acid, butanoic acid, caprylic acid, caproic acid, decanoic acid, dodecanoic acid, stearic acid, and oleic acid. Preferred aromatic monocarboxylic acids are, for example, benzoic acid, p-tert-butylbenzoic acid, orthotoluic acid, metatoluic acid, paratoluic acid, dimethylbenzoic acid, ethylbenzoic acid, normal-propylbenzoic acid, aminobenzoic acid, and acetoxybenzoic acid. These may be used singly or as a mixture of two or more thereof.

Specific examples of preferred polyester plasticizers are poly(ethylene glycol/adipic acid) ester, poly(propylene glycol/adipic acid) ester, poly(1,3-butanediol/adipic acid) ester, poly(propylene glycol/sebacic acid) ester, poly(1,3-butanediol/sebacic acid) ester, poly(1,6-hexanediol/adipic acid) ester, poly(propylene glycol/phthalic acid) ester, poly(1,3-butanediol/phthalic acid) ester, poly(propylene glycol/terephthalic acid) ester, poly(propylene glycol/1,5-naphthalene-dicarboxylic acid) ester, poly(propylene glycol/terephthalic acid) ester of which both ends are blocked with 2-ethylhexyl alcohol ester, poly(propylene glycol/adipic acid) ester of which both ends are blocked with 2-ethylhexyl alcohol ester, and acetylated poly(butanediol/adipic acid) ester.

These polyesters may be readily synthesized in any ordinary methods. For example, the above-mentioned dibasic acid or its alkyl ester is reacted with a glycol through polyesterification or interesterification according to a thermal fusion condensation method; or the acid chloride of the acid is reacted with a glycol according to an interfacial condensation method. The polyester plasticizers are described in detail in Koichi Murai, *Kasozai Sono Riron-to-Oyo* (Plasticizers, Their Theory and Application), (by Miyuki Publishing, Mar. 1, 1973, 1st Edition). In addition, the materials described in JP-A-5-155809, JP-A-5-155810, JP-A-5-197073, JP-A-2006-259494, JP-A-7-330670, JP-A-2006-342227, and JP-A-2007-003679 are also usable herein.

As commercially available products, Adekacizers from ADEKA Corporation, (various types of Adekacizer P series and Adekacizer PN series) described in DIARY 2007, pp. 5-27 are usable. Also, DIC Corporation's various commercial products of Polylight series described in *List of Polymer-Related Commercial Products*, 2007, p. 25 are usable; and DIC Corporation's various commercial products of Polycizer series described in *DIC's Polymer Modifiers* (issued 2004. 4. 1., 000VIII), pp. 2-5 are usable. Further, US CP HALL's Plasthall P series are available. Velsicol Chemicals (Rosemont, Ill.) commercially sells benzoyl-functionalized polyethers under the trade name of BENZOFLEX (e.g., BENZOFLEX 400, polypropylene glycol dibenzoate).

(Polyester Polyether Plasticizer)

Next, polyester polyether plasticizers for use in the invention are described. The polyester polyether plasticizers for use in the invention are condensed polymers of a dicarboxylic acid and a polyether diol. As the dicarboxylic acid, the aliphatic dicarboxylic acid having from 4 to 12 carbon atoms or the aromatic dicarboxylic acid having from 8 to 12 carbon atoms described in the above for polyester plasticizers are used as such.

Next, as the polyether having an aliphatic glycol with from 2 to 12 carbon atoms, there are illustrated polyethylene ether glycol, polypropylene ether glycol, polytetramethylene ether glycol, and their combinations. Commercially available polyether glycols that are typically usable herein are Carbowax resin, Plurnics resin, and Niax resin. In producing the polyester polyether plasticizers for use in the invention, any polymerization method well known to those skilled in the art is employable.

As these polyester polyether plasticizers, there are illustrated polyester polyether plasticizers described in U.S. Pat. No. 4,349,469. Basically, they are polyester polyether plasticizers produced from, for example, 1,4-cyclohexanedicarboxylic acid as a dicarboxylic acid component and 1,4-cyclohexanedimethanol and polytetramethylene ether glycol as a polyether component. As other useful polyester polyether plasticizers, there are illustrated commercially available resins such as DuPont's Hytrel copolyesters, and GAF's Galflex copolymers. For these, the materials described in JP-A-5-197073 are employable. Commercially available products from ADEKA as Adekacizer RS series are usable herein. Also, the polyesterpolyether plasticizers of the alkyl-functionalized polyalkyleneoxide is commercially sold under the trade name of PYCAL (e.g., PYCAL 94, polyethylene oxide phenyl ester) by ICI Chemicals (Wilmington, Del.).

(Polyester Polyurethane Plasticizer)

Further, polyester polyurethane plasticizers for use in the invention are described. The plasticizers may be obtained through condensation of a polyester with an isocyanate compound. As the polyester, those polyesters which are unblocked at both ends thereof may be used as such; and those which are described hereinbefore with respect to polyester plasticizers may preferably be used herein.

The diisocyanate component to constitute the polyurethane structure includes $OCN(CH_2)_p NCO$ (p=2 to 8) polymethylene isocyanates, typically ethylene diisocyanate, trimethylene diisocyanate, tetramethylene diisocyanate, and hexamethylene diisocyanate; and aromatic diisocyanates such as p-phenylene diisocyanate, tolylene diisocyanate, p,p'-diphenylmethane diisocyanate, and 1,5-naphthylene diisocyanate; and, further, m-xylylene diisocyanate, to which, however, the diisocyanate compound should not be limited. Of these, tolylene diisocyanate, m-xylylene diisocyanate, and tetramethylene diisocyanate are especially preferred.

The polyester polyurethane plasticizers in the invention may readily be obtained in an ordinary synthesizing method in which starting compounds of a polyester diol and a diisocyanate are mixed and stirred under heat. For these materials, the materials described in JP-A-5-197073, JP-A-2001-122979, JP-A-2004-175971, and JP-A-2004-175972 may be used.

(Other High Molecular Plasticizers)

In the invention, not only the above-mentioned polyester plasticizers, polyester polyether plasticizers, and polyester polyurethane plasticizers, but also any other high molecular plasticizers are usable. The other high molecular plasticizers include aliphatic hydrocarbon polymers; alicyclic hydrocarbon polymers; acrylic polymers such as polyacrylates and polymethacrylates (in which the ester group is, for example, a methyl group, an ethyl group, a propyl group, a butyl group, an isobutyl group, a pentyl group, a hexyl group, a cyclohexyl group, an octyl group, a 2-ethylhexyl group, a nonyl group, an isononyl group, a tert-nonyl group, a dodecyl group, a tridecyl group, a stearyl group, an oleyl group, a benzyl group, or a phenyl group); vinyl polymers such as polyvinyl isobutyl ether and polyN-vinylpyrrolidone; styrenic polymers such as polystyrene and poly-4-hydroxystyrene; polyethers such as polyethylene oxide and polypropylene oxide; polyamides; polyurethanes; polyureas; phenol/formaldehyde condensates; urea/formaldehyde condensates; and polyvinyl acetate.

These polymer plasticizers may be homo-polymers comprising one kind of a repeating unit, or may be copolymers comprising plural kinds of repeating structures. Two or more of the above polymers may be used in combination thereof. These high molecular plasticizers may be used either alone or as a mixture thereof to provide the same effect. Of these, polyacrylates, polymethacrylates, and their copolymers with any other vinyl monomer are preferred. High molecular plasticizers basically comprising acrylic polymers such as polyacrylates and polymethacrylates (in which the ester group is a methyl group, an ethyl group, a propyl group, a butyl group, a hexyl group, a cyclohexyl group, a 2-ethylhexyl group, an isononyl group, or an oleyl group) are particularly preferred.

(Specific Examples of High Molecular Plasticizers)

Preferred specific examples of the high molecular plasticizers are described below; however, the high molecular plasticizers usable in the invention should not be limited to these.

PP-1: Condensate of ethanediol/succinic acid (1/1 by mol) (number-average molecular weight: 2500)
PP-2: Condensate of 1,3-propanediol/glutaric acid (1/1 by mol) (number-average molecular weight: 1500)
PP-3: Condensate of 1,3-propanediol/adipic acid (1/1 by mol) (number-average molecular weight: 1300)
PP-4: Condensate of 1,3-propanediol/ethylene glycol/adipic acid (1/1/2 by mol) (number-average molecular weight: 1500)
PP-5: Condensate of 2-methyl-1,3-propanediol/adipic acid (1/1 by mol) (number-average molecular weight 1200)
PP-6: Condensate of 1,4-butanediol/adipic acid (1/1 by mol) (number-average molecular weight: 1500)
PP-7: Condensate of 1,4-cyclohexanediol/succinic acid (1/1 by mol) (number-average molecular weight: 800)
PP-8: Condensate of 1,3-propanediol/succinic acid (1/1 by mol) blocked with butyl ester at both ends (number-average molecular weight: 1300)
PP-9: Condensate of 1,3-propanediol/glutaric acid (1/1 by mol) blocked with cyclohexyl ester at both ends (number-average molecular weight: 1500)
PP-10: Condensate of ethanediol/succinic acid (1/1 by mol) blocked with 2-ethylhexyl ester at both ends (number-average molecular weight: 3000)
PP-11: Condensate of 1,3-propanediol/ethylene glycol/adipic acid (1/1/2 by mol) blocked with isononyl ester at both ends (number-average molecular weight: 1500)
PP-12: Condensate of 2-methyl-1,3-propanediol/adipic acid (1/1 by mol) blocked with propyl ester at both ends (number-average molecular weight: 1300)
PP-13: Condensate of 2-methyl-1,3-propanediol/adipic acid (1/1 by mol) blocked with 2-ethylhexyl ester at both ends (number-average molecular weight: 1300)
PP-14: Condensate of 2-methyl-1,3-propanediol/adipic acid (1/1 by mol) blocked with isononyl ester at both ends (number-average molecular weight: 1300)
PP-15: Condensate of 1,4-butanediol/adipic acid (1/1 by mol) blocked with butyl ester at both ends (number-average molecular weight: 1800)
PP-16: Condensate of ethanediol/terephthalic acid (1/1 by mol) (number-average molecular weight: 2000)
PP-17: Condensate of 1,3-propanediol/1,5-naphthalenedicarboxylic acid (1/1 by mol) (number-average molecular weight: 1500)
PP-18: Condensate of 2-methyl-1,3-propanediol/isophthalic acid (1/1 by mol) (number-average molecular weight: 1200)
PP-19: Condensate of 1,3-propanediol/terephthalic acid (1/1 by mol) blocked with benzyl ester at both ends (number-average molecular weight: 1500)
PP-20: Condensate of 1,3-propanediol/1,5-naphthalenedicarboxylic acid (1/1 by mol) blocked with propyl ester at both ends (number-average molecular weight: 1500)
PP-21: Condensate of 2-methyl-1,3-propanediol/isophthalic acid (1/1 by mol) blocked with butyl ester at both ends (number-average molecular weight: 1200)
PP-22: Condensate of poly(average polymerization degree: 5) propylene ether glycol/succinic acid (1/1 by mol) (number-average molecular weight: 1800)
PP-23: Condensate of poly(average polymerization degree: 3) ethylene ether glycol/glutaric acid (1/1 by mol) (number-average molecular weight: 1600)
PP-24: Condensate of poly(average polymerization degree: 4) propylene ether glycol/adipic acid (1/1 by mol) (number-average molecular weight: 2200)
PP-25: Condensate of poly(average polymerization degree: 4) propylene ether glycol/phthalic acid (1/1 by mol) (number-average molecular weight 1500)
PP-26: Condensate of poly(average polymerization degree: 5) propylene ether glycol/succinic acid (1/1 by mol) blocked with butyl ester at both ends (number-average molecular weight: 1900)
PP-27: Condensate of poly(average polymerization degree: 3) ethylene ether glycol/glutaric acid (1/1 by mol) blocked with 2-ethylhexyl ester at both ends (number-average molecular weight: 1700)
PP-28: Condensate of poly(average polymerization degree: 4) propylene ether glycol/adipic acid (1/1 by mol) blocked with tert-nonyl ester at both ends (number-average molecular weight: 1300)
PP-29: Condensate of poly(average polymerization degree: 4) propylene ether glycol/phthalic acid (1/1 by mol) blocked with propyl ester at both ends (number-average molecular weight: 1600)
PP-29': Condensate of ethanediol/adipic acid (1/1 by mol) (number-average molecular weight: 1000)
PP-30: Polyester urethane compound produced through condensation of 1,3-propanediol/succinic acid (1/1 by mol) condensate (number-average molecular weight: 1500) with trimethylene diisocyanate (1 mol)
PP-31: Polyester urethane compound produced through condensation of 1,3-propanediol/glutaric acid (1/1 by mol) condensate (number-average molecular weight: 1200) with tetramethylene diisocyanate (1 mol)
PP-32: Polyester urethane compound produced through condensation of 1,3-propanediol/adipic acid (1/1 by mol) condensate (number-average molecular weight: 1000) with p-phenylene diisocyanate (1 mol)
PP-33: Polyester urethane compound produced through condensation of 1,3-propanediol/ethylene glycol/adipic acid (1/1/2 by mol) condensate (number-average molecular weight: 1500) with tolylene diisocyanate (1 mol)
PP-34: Polyester urethane compound produced through condensation of 2-methyl-1,3-propanediol/adipic acid (1/1 by mol) condensate (number-average molecular weight: 1200) with m-xylylene diisocyanate (1 mol)
PP-35: Polyester urethane compound produced through condensation of 1,4-butanediol/adipic acid (1/1 by mol) condensate (number-average molecular weight: 1500) with tetramethylene diisocyanate (1 mol)
PP-36: Polyisopropyl acrylate (number-average molecular weight: 1300)

PP-37: Polybutyl acrylate (number-average molecular weight: 1300)
PP-38: Polyisopropyl methacrylate (number-average molecular weight: 1200)
PP-39: Poly(methyl methacrylate/butyl methacrylate) (8/2 by mol) (number-average molecular weight: 1600)
PP-40: Poly(methyl methacrylate/2-ethylhexyl methacrylate) (9/1 by mol) (number-average molecular weight: 1600)
PP-41: Polyvinyl acetate (number-average molecular weight: 2400).

(Preparation of Cellulose Acylate Solution)

The cellulose acylate solution may be prepared, for example, according to the methods described in JP-A-58-127737, JP-A-61-106628, JP-A-2-276830, JP-A-4-259511, JP-A-5-163301, JP-A-9-95544, JP-A-10-45950, JP-A-10-95854, JP-A-11-71463, JP-A-11-302388, JP-A-11-322946, JP-A-11-322947, JP-A-11-323017, JP-A-2000-53784, JP-A-2000-273184, and JP-A-2000-273239. Specifically, the polymer and the solvent are mixed and stirred so that the cellulose acylate is swollen and, in some cases, this is cooled or heated so as to dissolve the cellulose acylate, and thereafter this is filtered to obtain a cellulose acylate solution. The content of solid components in the resulting cellulose acylate solution is preferably from 5 to 40% by weight.

In the invention, a step of cooling and/or heating the mixture of polymer and solvent for the purpose of improving the solubility of the polymer in the solvent is preferably involved.

In the case where a halogen-containing organic solvent is used as the solvent and where the mixture of cellulose acylate and solvent is cooled, it is desirable that a step of cooling the mixture to −100 to 10° C. is preferably included. Also preferably, the method includes a step of swelling the mixture at −10 to 39° C. prior to the cooling step, and includes a step of heating it at 0 to 39° C. after the cooling step.

In the case where a halogen-containing organic solvent is used as the solvent and the mixture of cellulose acylate and the solvent is heated, it is desirable that method includes a step of dissolving cellulose acylate in the solvent according to at least one method selected from the following (a) and (b):
(a) The mixture is swollen at −10 to 39° C., and the resulting mixture is heated at 0 to 39° C.
(b) The mixture is swollen at −10 to 39° C., and the resulting mixture is heated under 0.2 to 30 MPa and at 40 to 240° C., and then the heated mixture is cooled to 0 to 39° C.

Further, in the case where a halogen-free organic solvent is used as the solvent and the mixture of cellulose acylate and the solvent is cooled, the method preferably includes a step of cooling the mixture to −100 to −10° C. Also preferably, the method includes a step of swelling the mixture at −10 to 55° C. prior to the cooling step, and includes a step of heating it at 0 to 57° C. after the cooling step.

In the case where a halogen-containing organic solvent is used as the solvent and the mixture of cellulose acylate and the solvent is heated, it is desirable that method includes a step of dissolving cellulose acylate in the solvent according to at least one method selected from the following (c) and (d):
(c) The mixture is swollen at −10 to 55° C., and the resulting mixture is heated at 0 to 57° C.
(d) The mixture is swollen at −10 to 55° C., and the resulting mixture is heated under 0.2 to 30 MPa and at 40 to 240° C., and then the heated mixture is cooled to 0 to 57° C.

[Formation of Cellulose Acylate Film for Use in the Production Method of the Invention]

The cellulose acylate film for use in the production method of the invention may be produced according to a solution casting film formation method using the above-mentioned cellulose acylate solution. The solution casting film formation method may be performed in any conventional manner using a conventional apparatus. Specifically, a dope (cellulose acylate solution) prepared in a dissolver (tank) is filtered, and then it is once stored in a storage tank in which the dope is defoamed to be a final dope. The dope is kept warmed at 30° C., and fed into a pressure die from the dope take-out port, for example, via a pressure meter gear pump via which a predetermined amount of the dope may be accurately fed to the die by controlling the revolution thereof, and the dope is then uniformly cast onto a metal support in the casting zone that runs endlessly, through the slit of the pressure die (casting step). Next, at the peeling point at which the metal support runs almost one-round, a wet dope film (this may also be referred to as a web) is peeled from the metal support, and then conveyed to a drying zone, in which the web is dried while being conveyed therein by rolls. The details of the casting step and the drying step of the solution casting film formation method are described in JP-A-2005-104148, pp. 120-146, which are suitably applicable to the invention.

The cellulose acylate film for use in the production method of the invention may also be produced according to a melt casting film formation method, not using the above-mentioned cellulose acylate solution. The melt casting film formation method comprises heating polymer, casting the polymer melt onto a support, and cooling it to form a film. In the case where the melting point of the polymer, or the melting point of the mixture of the polymer and various additives thereto, is lower than the decomposition temperature thereof and higher than the stretching temperature thereof, the melt casting film formation method is employable. The melt casting film formation method is described, for example, in JP-A-2000-352620. The resulting web or film is subjected to wet stretching and/or dry stretching according to the method described below.

(Casting, Drying)

In the invention, a drum (metal drum) or a band (metal band) may be used as the metal support to be used in the casting step. In the former case, the cast film may be peeled from the support in the state that the amount of residual solvent is large by keeping the temperature of the metal support surface at a comparatively low level, which serves to improve film-forming speed, thus such case being preferred. Also, it can suppress surface roughening in contacting the film with an organic solvent to be described hereinafter assumingly due to adequate adjustment of crystal state of the film, thus being preferred. The temperature of the metal support surface is preferably from −30 to 110° C., more preferably from −20 to 7° C., still more preferably from −15 to 5° C. Also, the solvent constituting the dope is preferably a solvent containing from 1 to 15% by weight of a solvent having a boiling point of 95° C. or higher. Further, the residual solvent amount in the web calculated based on the following formula upon peeling the web from the metal support is in the range of preferably from 101 to 400% by weight, more preferably from 120 to 300% by weight, still more preferably from 150 to 200% by weight.

$$\text{Residual solvent amount}(\% \text{ by weight}) = \{(M-N)/N\} \times 100$$

[in the formula, M represents the weight of the cellulose acylate film just before being inserted into the stretching zone; and N represents the weight of the cellulose acylate film obtained by drying the cellulose acylate film just before being inserted into the stretching zone, at 110° C. for 3 hours.]

(Stretching Step)
(Wet stretching)

In the invention, a metal band or a metal drum may be used as a metal support for use in forming a cellulose acylate film which is to be contacted with an organic solvent.

In controlling the retardation of the cellulose acylate film produced by the production method of the invention, it is desirable that the mechanical history to be given to the cellulose acylate film before being contacted with the organic solvent, that is, the external force to be applied to the cellulose acylate web during the film formation step is controlled. Specifically, in the case where the cellulose acylate film produced according to the production method of the invention has a large Re, the cellulose acylate web is stretched preferably by from 0.01 to 300%, more preferably from 1 to 200%, still more preferably from 10 to 100%, most preferably from 20 to 70%. In the case where the cellulose acylate film before being contacted with the organic solvent is produced while being conveyed, the stretching direction may be any of longitudinal direction (substantially, stretching in the film-conveying direction), transverse direction (substantially, stretching in the perpendicular direction to the conveying direction), oblique direction, and a combination of these directions. However, a combination of a longitudinal stretching and a transverse stretching is preferred. They may be performed in one step or in multi-steps. The residual solvent amount in the cellulose acylate web to be stretched is calculated according to the following formula, and is from 5 to 1000%. Preferably, the residual solvent amount is from 10 to 500%, more preferably from 30 to 300%, still more preferably from 40 to 150%.

$$\text{Residual Solvent Amount(\% by weight)} = \{(M-N)/N\} \times 100$$

[in the formula, M represents the weight of the cellulose acylate film just before being inserted into the stretching zone; and N represents the weight of the cellulose acylate film obtained by drying the cellulose acylate film just before being inserted into the stretching zone at 110° C. for 3 hours.]

The stretching ratio of the cellulose acylate web in the longitudinal stretching may be adjusted through the peripheral speed difference between the metal support speed and the peeling speed (peeling roll draw) or through the peripheral speed difference in a roll stretching apparatus (wherein longitudinal stretching is attained by using two or more pairs of nip rolls, with rolls on the outlet port side having a faster peripheral speed). Also, the stretching ratio may be adjusted through the rail width or clip-conveying speed in a tenter stretching apparatus (wherein both edges of the film are grasped with chucks, and the chucks are widened in the transverse direction (perpendicular to the longitudinal direction) to perform stretching). Such stretching may control the retardation expression of the stretched film.

When the film having a residual solvent amount of 5% or more is stretched, it becomes difficult for its haze to be large; and when the film having a residual solvent amount of 1000% or less is stretched, the external force given to the cellulose acylate polymer chains may be readily transmitted thereto and the effect of the retardation expression control by stretching the solvent-containing cellulose acylate web may be thereby enhanced. The residual solvent amount in the cellulose acylate web may be suitably adjusted by changing the concentration of the cellulose acylate solution, the temperature and the speed of the metal support, the temperature and the flow rate of the drying air, and the solvent gas concentration in the drying atmosphere.

In the cellulose acylate web stretching step, the web surface temperature is preferably lower, from the viewpoint of transmitting the external force to the cellulose acylate polymer and is preferably higher, from the viewpoint of uniformly stretching it. Thus, the web temperature is preferably from (Tg−20) to (Tg+50)° C., more preferably from (Tg−10) to (Tg+45)° C., still more preferably from Tg to (Tg+40)° C., most preferably from (Tg+5) to (Tg+35)° C. Here, Tg means the glass transition temperature (unit: ° C.) of the cellulose acylate web, and Tg of the cellulose acylate web in a solvent-containing state can be measured by means of a temperature modulated differential scanning calorimeter (mDSC). In many cases, Tg of cellulose acylate web is lower than Tg of the cellulose acylate film to be described hereinafter.

The thus stretched cellulose acylate web is then conveyed into a drying zone, in which it is clipped with a tenter at both edges and, while being conveyed with rolls, it is dried.

The residual solvent amount in the thus-dried film is preferably from 0 to 10% by weight, more preferably from 0 to 5% by weight, still more preferably from 0 to 2% by weight, most preferably from 0 to 1% by weight. This film may be conveyed as such to a zone where it is to be contacted with an organic solvent, or it is also possible to perform the step of contacting the film with an organic solvent in an off-line manner after winding up the film (hereinafter, this stretching is also referred to as "organic solvent-contacting step"). Further, a stretching (dry stretching) step and a heat treatment step may be performed in combination with the organic solvent-contacting step according to the purpose. Additionally, in the case of employing the dry stretching step in combination, the step may be performed prior to the organic solvent-contacting step or after the organic solvent-contacting step, with the former being more preferred. The width of the cellulose acylate film before being contacted with the organic solvent is preferably from 0.5 to 5 m, more preferably from 0.7 to 3 m. Also, in the case of once winding up the film, the roll length is preferably from 300 to 30,000 m, more preferably from 500 to 10,000 m, still more preferably from 1,000 to 7,000 m.

(Dry Stretching)

In the invention, the cellulose acylate film having been formed in the above-described manner may be subjected to stretching before or after the heat treatment step or the organic solvent-contacting step to be described hereinafter (hereinafter, this stretching is also referred to as "dry stretching"). Expression of Re or Rth may further be adjusted by performing the dry stretching. The advantage of the invention is particularly effective with cellulose acylate films produced via the dry stretching step. Specifically, the attainable range of Re or Rth may be enlarged, and haze may be reduced, by adjusting the stretching temperature or increasing stretching ratio within the range to be described hereinafter. In addition, without departing from the gist of the invention, other step may be provided between the drying step and the organic solvent-contacting step.

In the production of the invention, dry stretching is preferably performed at a temperature of from (Tg−20) to (Tg+50)° C. wherein Tg represents the glass transition temperature (unit: ° C.) of the cellulose acylate film to be used in the production method of the invention. The preliminary stretching temperature is more preferably from (Tg−10) to (Tg+45)° C., still more preferably from Tg to (Tg+40)° C., most preferably from (Tg+5) to (Tg+35)° C., provided that the dry stretching temperature does not exceed the heat treatment temperature to be described hereinafter. The dry stretching temperature is preferably lower than the heat treatment temperature by 5° C. or more, more preferably lower than the heat treatment temperature by 10° C. or more, still more preferably lower than the heat treatment temperature by 15° C. or more. The residual solvent amount in this occasion is preferably from 0 to 5% by weight, more preferably from 0 to 3% by weight.

In the invention, the glass transition temperature is the boundary temperature at which the mobility of the polymer that constitutes the cellulose acylate film of the invention greatly changes. The glass transition temperature in the invention is a temperature which is determined as follows: 20 mg of the cellulose acylate film to be used for the production method of the invention is put into a sample pan for differential scanning calorimetry (DSC), heated in a nitrogen atmosphere at a rate of 10° C./min from 30° C. up to 120° C., kept as such for 15 minutes, and then cooled to 30° C. at a rate of −20° C./min. Then, this is again heated from 30° C. up to 250° C., and the temperature at which the base line of the temperature profile of the film begins to deviate from the low temperature side is referred to as the glass transition temperature of the film.

In the production method of the invention, haze can be reduced by controlling the temperature of the cellulose acylate film for use in the production method of the invention to approximately the crystallization temperature (Tc) or higher in the heat treatment step to be described hereinafter. Balance between aggregation and orientation of the cellulose acylate polymer chains and simultaneously occurring heat mitigation can appropriately be controlled by adjusting the dry stretching temperature to lower than the heat treatment temperature. Thus, there is provided the advantage that the cellulose acylate polymer can effectively be oriented.

The direction of the dry stretching is not particularly limited and, in the case where the cellulose acylate film before being contacted with the organic solvent is conveyed, the stretching direction may be any of longitudinal stretching, transverse stretching, oblique stretching, and a combination thereof. However, it is preferred to stretch in the direction substantially parallel to the direction of intended slow axis. For example, in order to be favorably used for IPS-mode or VA-mode liquid crystal panels, it is preferred for the slow axis in the film plane to be expressed in the width direction, and hence the dry stretching is preferably a transverse stretching. Regarding longitudinally stretching method and transversely stretching method and preferred embodiments, reference may be made to the section of heat treatment to be described hereinafter. From the standpoint of retardation expression and adhesion to the polarizing plate, the dry stretching ratio is preferably from 1 to 500%, preferably from 3 to 400%, more preferably from 5 to 300%, still more preferably from 10 to 100%, particularly preferably from 30 to 70%. The dry stretching may be performed in one step or in multi-steps. Additionally, the term "dry stretching ratio (%)" as used herein means the value determined according to the following formula.

Dry stretching ratio(%)=100×{(length after stretching)−(length before stretching)}/length before stretching The stretching rate in the dry stretching is preferably from 10 to 10,000%/min, more preferably from 20 to 1,000%/min, still more preferably from 30 to 800%/min.

(Heat Treatment)

The production method for a cellulose acylate film of the invention may include a step of heat treatment the cellulose acylate film at a temperature T (unit: ° C.) satisfying the following formula (1). This heat treatment step may be performed after the film-forming step or the wet stretching step, or before or after the dry stretching step or the organic solvent-contacting step. This heat treatment enables production of a cellulose acylate film which has a low haze and a large elasticity, which suffers only a small dimensional change due to humidity, and which has appropriate moisture permeability. Here, the heat treatment may be performed batchwise or while the film being conveyed, and is preferably performed while the film is conveyed.

$$Tc-10 \leq T < Tm_0 \qquad \text{Formula (1)}$$

In formula (1), Tc represents the crystallization temperature of the cellulose acylate film before the heat treatment, with its unit being ° C. In the invention, the crystallization temperature means a temperature at which the polymer that constitutes the cellulose acylate film forms a regular periodic structure. When exceeding this temperature, a structure detectable in X-ray diffractometry grows. The crystallization temperature in the invention may be determined as follows: 20 mg of the cellulose acylate film before heat treatment is put into a sample pan for DSC, heated in a nitrogen atmosphere at a rate of 10° C./min from 30° C. up to 120° C., kept as such for 15 minutes, and then cooled to 30° C. at a rate of −20° C./min. Then, this is again heated from 30° C. up to 300° C., and the exothermic peak starting temperature detected in the test is the crystallization temperature of the tested film. Additionally, in the case where no exothermic peak is observed in this range, it is regarded that the crystallization temperature is not observed. In general, Tc appears on the higher temperature side than the above-mentioned glass transition temperature (Tg). For example, the crystallization temperature of a cellulose triacetate film having a degree of total substitution of 2.85 is about 190° C., though varying depending on the additives thereto and the film formation condition; and the crystallization temperature of a cellulose triacetate film having a degree of total substitution of 2.92 is about 170° C.

In formula (1), $Tm_0$ means the melting point of the cellulose acylate film before heat treatment, with its unit being ° C. In the invention, the melting point is a temperature determined as follows: 20 mg of a cellulose acylate film before heat treatment is put into a sample pan for DSC, heated in a nitrogen atmosphere at a rate of 10° C./min from 30° C. up to 120° C., kept as such for 15 minutes, and then cooled to 30° C. at a rate of −20° C./min. Then, this is again heated from 30° C. up to 300° C., and the endothermic peak starting temperature detected in the test is the melting point of the tested film sample. In general, the melting point ($Tm_0$) appears on the higher temperature side than the above-mentioned crystallization temperature (Tc). For example, the melting point of a cellulose triacetate film having a degree of total substitution of 2.85 is about 285° C., though varying depending on the additives thereto and the film formation condition and the melting point of a cellulose triacetate film having a degree of total substitution of 2.92 is about 290° C.

Heat treatment of the cellulose acylate film at the temperature T satisfying the condition of formula (1) may reduce haze of the cellulose acylate film and control the retardation expression of the film. The adjustment degree of the haze or retardation of the film can be controlled by selecting conditions in the film-forming step, conditions of wet stretching and dry stretching (temperature and stretching ratio), and conditions of the heat treatment (especially temperature). Also, the invention has made it possible to produce, in a simple method, a cellulose acylate film having an Nz of more than 0 and less than 1, which has heretofore been difficult to produce, or to produce a cellulose acylate film having an Nz of more than −0.25 and less than 1.25 by a transverse stretching machine by adjusting heat treatment temperature or conveying conditions.

The heat treatment temperature to be employed in the production method of the invention satisfies preferably the following formula (1a), more preferably the following formula (1b), still more preferably the following formula (1c). Selection of the temperature which satisfies these formulae provides the advantage that the Re expression may be increased or, in some cases, the stretching direction may cross at right angles to the slow axis direction.

$$Tc-5 \leq T < Tm_o-10 \quad \text{Formula (1a)}$$

$$Tc \leq T < Tm_o-30 \quad \text{Formula (1b)}$$

$$Tc+5 \leq T < Tm_o-50 \quad \text{Formula (1c)}$$

Preferably, in the production method of the invention, the cellulose acylate film is heat-treated while being conveyed. The conveying method for the cellulose acylate film is not particularly limited. As typical examples, the film may be conveyed with nip rolls or a suction drum, or may be conveyed while being held with tenter clips, or may be conveyed while being floated by pneumatic pressure. The method of conveying the film with nip rolls or a suction drum, or the method of conveying while holding the film with tenter clips is preferred. The method of conveying while holding the film with tenter clips is more preferred. Specifically, there can be illustrated one embodiment wherein the film is allowed to pass through the heat treatment zone while both edges of the film being held with tenter clips, to thereby perform heat treatment the cellulose acylate film.

The heat treatment of the invention may be performed, in some cases, while performing stretching. The dimensional change ratio in the direction perpendicular to the conveying direction is −10% or more, more preferably from −10 to 10%, more preferably from −10 to 5% by weight, still more preferably from −5 to 3%, yet more preferably from −3 to 1%. Thus, cracking tendency is suppressed, and formation of wrinkles like a galvanized corrugated iron sheet is prevented, with retardation expression being ensured, whereby a wider product can be obtained. Further, there is obtained the advantage that humidity dependency of Re or Rth can be reduced.

The film-conveying speed is generally from 1 to 500 m/min, preferably from 5 to 300 m/min, more preferably from 10 to 200 m/min, still more preferably from 20 to 100 m/min. When the film-conveying speed is at least the above-mentioned lower limit of 1 m/min, then the method tends to be favorable as capable of securing a sufficient industrial productivity; and when it is at most the above-mentioned higher limit of 500 m/min, then the method also tends to be favorable in the point that stretching and heat treatment can be performed in a practical zone length. Preferably, the film-conveying speed during heat treatment (the device speed of the nip rolls and the suction drum that determines the film-conveying speed) is kept constant.

The heat treatment method in the production method of the invention includes, for example, a method of allowing a cellulose acylate film to run in a zone having a temperature T while conveying through it; a method of applying hot air to a cellulose acylate film while conveying it; a method of irradiating a cellulose acylate film while conveying it with heat rays; and a method of contacting a cellulose acylate film with a heated roll.

The method of allowing a cellulose acylate film to run in a zone having a temperature T while applying hot air to the film is preferred. One advantage of the method is that a cellulose acylate film may be heated uniformly. The temperature inside the zone may be controlled and kept constant at T by a heater while monitoring with, for example, a temperature sensor. The conveying length of the cellulose acylate film running in the zone at a temperature T may vary depending on the property of the cellulose acylate film to be produced and on the film-conveying speed; but, in general, it is preferably so set that the ratio of (conveying length)/(width of the conveyed cellulose acylate film) can be from 0.01 to 100, more preferably from 0.1 to 50, still more preferably from 0.5 to 20. In this specification, the ratio may be referred to as an aspect ratio. The film-conveying time in the zone at a temperature T (heat treatment time) may be generally from 0.01 to 60 minutes, preferably from 0.03 to 10 minutes, more preferably from 0.05 to 5 minutes. Within the range, the retardation expression may be excellent and the haze of the film may be suppressed.

The heat treatment step of the cellulose acylate film may be performed only once or plural times in the production method of the invention. Heat treatment in plural times means that, after the previous heat treatment, the film is once cooled to a temperature lower than Tc, and then again heated up to a temperature of from Tc to lower than $Tm_0$, and heat-treated at that temperature while being conveyed. Heat treatment in plural times also means that plural zones different from each other in temperature are prepared and heat treatment is performed while conveying the film therethrough. In this case, the temperature may be increased gradually. In the heat treatment in plural times, it is desirable that the stretching ratio in stretching the film satisfies the above-mentioned range after completion of all the steps of heat treatment. Preferably, in the production method of the invention, the heat treatment is performed at most three times, more preferably at most two times.

[Cooling after Heat Treatment]

After being heat-treated, the cellulose acylate film is cooled to a temperature lower than Tc. In this occasion, humidity dependency of retardation (especially Re) of the finally obtained cellulose acylate film can be reduced by cooling the film with conveying it with a conveying tension of from 0.1 to 500 N/m. The conveying tension upon cooling is preferably from 1 to 400 N/m, more preferably from 10 to 300 N/m, still more preferably from 50 to 200 N/m. The humidity dependency of the retardation tends to be reduced and, further, the surface state tends to be made better, by controlling the conveying tension to 0.1 N/m or more. Also, dimensional change tends to be reduced by controlling the conveying tension to 500 N/m or less.

The conveying tension may be controlled, for example, by disposing at least a pair of tension controllers (e.g., nip rolls, suction drums) just before the cooling zone and after the cooling zone, and controlling the revolution speed of each unit. Specifically, when the ratio of the take-up speed (v2) to the feeding speed (v1) of a pair of tension controllers, (v2/v1), is reduced, then the conveying tension is lowered; but when it is increased, then the conveying tension is increased.

(Stretching after Heat Treatment (Re-Stretching))

In the production method of the invention, the cellulose acylate film processed in the above-mentioned heat treatment may be stretched. (For differentiating it from other stretching, it is referred to as "re-stretching".) Thus, the retardation of the transparent film to be obtained finally may be adjusted more appropriately, or formation of wrinkles like a galvanized corrugated iron sheet may be reduced. The re-stretching temperature may be suitably determined depending on the intended Re and Rth of the film. Preferably, the temperature is from (Tg−20) to (the above-mentioned heat treatment temperature+10)° C., more preferably from (Tg–10) to (the above-mentioned heat treatment temperature)° C., still more preferably from Tg to (the above-mentioned heat treatment temperature–10)° C. Here, Tg means the glass transition temperature (unit: ° C.) of the cellulose acylate film before heat treatment.

The re-stretching may be performed after the cellulose acylate film is cooled to the heat treatment temperature, or may be performed while being kept at the heat treatment temperature without being cooled.

As the re-stretching method, the same method as that of the above-described dry stretching or of the stretching as described in the section of stretching during heat treatment may be employed. The re-stretching may be performed in one stage or in plural stages. Preferably, the film is re-stretched according to the method of changing the revolution speed of nip rolls to thereby stretch the film in the conveying direction, or the method of holding the polymer film with tenter clips at both edges thereof and expanding it in the direction perpendicular to the conveying direction to thereby stretch the film in that direction.

The stretching ratio in re-stretching may be suitably determined depending on the necessary retardation of the cellulose acylate film. Preferably, it is from 0.01 to 500%, more preferably from 0.1 to 300%, still more preferably from 1 to 100%, particularly preferably from 10 to 80%. The stretching ratio in re-stretching as referred to herein may be defined by the following formula:

Stretching ratio in re-stretching(%)=100×{(length after re-stretching)−(length before re-stretching)}/(length before re-stretching).

The stretching speed in re-stretching is preferably from 10 to 10,000%/min, more preferably from 20 to 1,000%/min, still more preferably from 30 to 800%/min.

[Water Vapor Contacting Step]

In the production method for a cellulose acylate film of the invention, if desired, a step of keeping the film in contact with a contact vapor to be mentioned below (water vapor contacting step) may be applied to the cellulose acylate film. The effect of the water vapor contacting step is not particularly limited. For example, by wet heat treatment to be taken within a short period of time, the dimensional change and the fluctuation of various physical properties (e.g., Re, Rth) of the film, which may occur in a durability test for testing the film as to whether it can keep predetermined characteristics and quality under a predetermined environmental condition, may be prevented. Though not adhering to any theory, this may be attributed to that, when a contact vapor to be mentioned below is brought into contact with the cellulose acylate film, then the cellulose acylate film may absorb the molecules of the contact vapor and the glass transition temperature of the film is thereby lowered and, as a result, the diffusion of the molecules of the contact vapor in the cellulose acylate film is promoted as having obtained heat energy and, accordingly, the higher order structure of the cellulose acylate molecules is more readily transferred into a more stable structure therefore resulting in that, as compared with that in simple heat treatment, the structure of the cellulose acylate molecules can be stabilized within a shorter period of time. The water vapor contacting step may be performed in any stage of the production method of the invention, but is preferably performed after the above-mentioned stretching step or heat treatment step or organic solvent contacting step to be described hereinafter, more preferably after the above-mentioned stretching step or heat treatment step or organic solvent contacting step, still more preferably after the above-mentioned stretching step or heat treatment step. Before or after the water vapor contacting step, the surface treatment to be mentioned hereinafter may be properly applied to the film. The step of keeping the cellulose acylate film in contact with a water vapor-containing vapor (water vapor contacting step) is described hereunder.

(Water Vapor Contacting Step—Contact Vapor)

Though not particularly limited, the vapor to be contacted with the cellulose acylate film in the water vapor contacting step (contact vapor) may be any vapor prepared by vaporizing a liquid-state solvent, but is preferably a water vapor-containing vapor, more preferably a vapor of which the main ingredient is water vapor, still more preferably water vapor itself. In this context, the vapor containing water vapor as the main ingredient means the vapor itself when the vapor is a single substance vapor; however, when the vapor is a mixture of plural vapors, the main ingredient of the vapor mixture means the vapor having the highest weight fraction.

The contact vapor is preferably formed in a wet vapor supply apparatus. Specifically, a solvent in the form of a liquid is heated in a boiler to be a gaseous state, and then fed by a blower. The contact vapor may be properly mixed with air. After fed by a blower, this may further be heated through a heating unit. In this, the air is preferably a heated one. Thus produced, the contact vapor preferably has a temperature of from 70 to 200° C., more preferably from 80 to 160° C., most preferably from 100 to 140° C. In the case where the temperature of the vapor is higher than the upper limit temperature, the film may be strongly curled, thus such temperature being unfavorable; but in the case where the temperature is lower than the lower limit temperature, a sufficient effect cannot be attained. In the case where the contact vapor contains water, its relative humidity is preferably from 20 to 100%, more preferably from 40 to 100%, still more preferably from 60 to 100%.

The solvent in the form of a liquid includes a solvent that includes water, an organic solvent and an inorganic solvent. In the case where water is used, it may be soft water, hard water, pure water or the like. From the viewpoint of boiler protection, soft water is preferred. Contamination of the cellulose acylate film with impurities may cause the degradation of the optical properties and the mechanical properties of the cellulose acylate film products and, therefore, it is desirable to use water with impurities as few as possible. Accordingly, for preventing the cellulose acylate film from being contaminated with impurities, use of soft water or pure water is preferred, with pure water being more preferred. Pure water has an electric resistivity of at least 1 MΩ and, in particular, the concentration of a metal ion such as sodium, potassium, magnesium, calcium or the like therein is less than 1 ppm, and the concentration of an anion such as chloride, nitrate or the like is less than 0.1 ppm. Pure water can be readily prepared through a single unit of a reverse osmosis membrane, an ion exchange resin, a distillation device or their combination. In the case where an organic solvent is used, it includes methanol, acetone, and methyl ethyl ketone. Additionally, the solvent in the form of a liquid may contain a condensate liquid formed through condensation of a recovered vapor obtained by recovering the contact vapor having been used.

[Water Vapor Contacting Step—Contacting Step]

For contacting the cellulose acylate film with the above-mentioned contact vapor in the water vapor contacting step, a method of applying the contact vapor to the cellulose acylate film; a method of disposing the cellulose acylate film in a space filled with the contact vapor; or a method of allowing the cellulose acylate film to pass through a space filled with the contact vapor is employable. Of them, the method of applying the contact vapor to the cellulose acylate film or the method of allowing the cellulose acylate film to pass through a space filled with the contact vapor is preferred. Preferably, the contact between the cellulose acylate film and the contact vapor is attained while the cellulose acylate film is guided by plural rollers disposed in zigzags.

The contact time with the contact vapor is not particularly limited, but is preferably as short as possible within a range capable of exhibiting the effect of the invention, from the viewpoint of the production efficiency. The upper limit of the processing time is, for example, preferably 60 minutes or shorter, more preferably 10 minutes or shorter. On the other hand, the lower limit of the processing time is, for example, preferably 10 seconds or longer, more preferably 30 seconds or longer.

The temperature of the cellulose acylate film to be contacted with the contact vapor is preferably, but not particularly limited, from 100 to 150° C.

The residual solvent amount in the cellulose acylate film before contact with water vapor is preferably, but not particularly limited, such that the cellulose acylate molecules has little fluidity, and is preferably from 0 to 5% by weight, more preferably from 0 to 0.3% by weight.

The contact vapor having been contacted with the cellulose acylate is fed into a condenser unit connected with a cooling unit, in which the vapor may be separated into a hot vapor and a condensed liquid.

(Water Vapor Contacting Step—Drying Step)

The cellulose acylate film thus contacted with the contact vapor in the manner as above may be cooled to almost room temperature directly as it is or, for adjusting the amount of the contact vapor molecules remaining in the film, it may be conveyed into a drying zone. In the case where the film is conveyed into a drying zone, the same drying method as that described for the drying step in the previous organic solvent contact process is preferably employed. Additionally, in the case where the water vapor contacting step is performed before the above-mentioned stretching step or heat treatment step or organic solvent contacting step to be described hereinafter, any of those steps may be the drying step.

[Step of Contacting with Organic Solvent (Organic Solvent Contacting Step)]

The production method for a cellulose acylate film of the invention is characterized in that an organic solvent is contacted with the surface of the cellulose acylate film and then the organic solvent is evaporated away, whereby an adhesive layer of the cellulose acylate film is formed. The adhesiveness enhancement is especially favorably applied to the cellulose acylate film having an increased degree of orientation. Accordingly, in the case where only one surface of the cellulose acylate film is contacted with an organic solvent and the resulting cellulose acylate film is directly stuck to a polarizer, it is desirable that the surface of the film contacted with the organic solvent is stuck to the polarizer. Additionally, the organic solvent contacting step may be performed after the film-forming step or the wet stretching step, or before and/or after the dry stretching or the heat treatment step, preferably after stretching. Also preferably, the film may preferably be subjected to the surface treatment to be described hereinafter before or after the organic solvent contacting step. The step of contacting the cellulose acylate film with an organic solvent (organic solvent contacting step) is described below.

(Solvent)

The organic solvent to be used in the organic solvent contacting step preferably contains, as the main solvent thereof, a good solvent for the cellulose acylate film; and the main solvent for use in the cellulose acylate solution in the above-mentioned cellulose acylate solution casting film formation step is preferably used for it.

Though not adhering to any theory, the reason why the process of contacting the cellulose acylate film with an organic solvent before the organic solvent contacting step may enhance the adhesiveness of the film to a polarizer may be considered because the orientation of the cellulose acylate polymer in the thickness direction of the cellulose acylate film may be disordered and the brittleness of the film in the thickness direction may be thereby retarded (interlayer delamination of the film is inhibited). On the other hand, when the orientation of the cellulose acylate polymer is disordered, then the film retardation may change and, therefore, it is desirable that the film orientation as a bulk of the film is not disordered. Accordingly, in order to satisfy both the retardation expression and the film adhesiveness to a polarizer, it is important that, in at least one surface of the film, the in-plane orientation from the surface to the depth of from 0 to 3 μm is controlled to be less than the in-plane orientation in the depth of from 3 to 10 μm from the surface. Such film can be prepared by, for example, using, as a main solvent in the organic solvent contacting step, a solvent which has a suitably controlled solubility of the cellulose acylate polymer therein, volatility (driability), and penetrability into the cellulose acylate film, or by adjusting the drying speed in the drying step after the organic solvent contacting step to an appropriate speed.

Namely, of the above-mentioned good solvents, organic solvents selected from ketones, esters, and halogenated hydrocarbons are more preferred as the main solvent for the organic solvent for use in the organic solvent contacting step; and ketones and esters are still more preferred from the viewpoint of reducing film curling and of reducing coating unevenness. The organic solvent for use in the organic solvent contacting step may properly contain any other ingredient solid at room temperature, such as polymers, additives, etc.

Examples of preferred organic solvents and their combinations for use in the organic solvent contacting step in the invention are mentioned below, to which, however, the invention should not be limited. The numerical values indicating the ratio are by weight.

(1) acetone=100
(2) acetone/methyl isobutyl ketone=80/20
(3) acetone/cyclohexanone=80/20
(4) acetone/cyclohexanone=60/40
(5) acetone/cyclohexanone=40/60
(6) acetone/water=95/5
(7) acetone/water=80/20
(8) acetone/methyl acetacetate/methanol/ethanol=65/20/10/5
(9) acetone/cyclopentanone/ethanol/butanol=65/20/10/5
(10) methyl ethyl ketone=100
(11) methyl ethyl ketone/cyclohexanone=80/20
(12) methyl ethyl ketone/cyclohexanone=60/40
(13) methyl ethyl ketone/cyclohexanone=40/60
(14) methyl acetate=100
(15) methyl acetate/acetone/methanol/ethanol/butanol=75/10/5/5/5
(16) methyl acetate/acetone/butanol=85/5/5
(17) methyl acetate/acetone/ethanol/butanol=80/8/8/4
(18) methyl formate/methyl ethyl ketone/acetone/methanol/ethanol=50/20/20/5/5
(19) ethyl acetate=100
(20) butyl acetate=100
(21) dichloromethane=100
(22) dichloromethane/methanol/butanol=83/15/2

(23) dichloromethane/methanol/butanol/water=85/18/1.5/0.5
(24) dichloromethane/methanol=87/13
(25) acetone/(cellulose acetate having a degree of acetyl substitution of 2.11)=99/1
(26) dichloromethane/methanol/butanol/(cellulose acetate having a degree of acetyl substitution of 2.86)=82/15/2/1
(Contacting Step)

As a method for contacting the cellulose acylate film with an organic solvent in the organic solvent contacting step, there may be employed any known ordinary contacting method, for example, a dipping method, an air knife coating method, a curtain coating method, a roller coating method, a wire bar coating method, a gravure coating method, a slide coating method, a spraying method, a die coating method, an extrusion coating method of using a hopper described in U.S. Pat. No. 2,681,294, and a micro-gravure coating method. It is also possible to contact the film with an organic solvent by using the organic solvent in place of water which is the main solvent in the aforesaid water vapor contacting step. In this step, the concentration of the organic solvent to be contacted with the cellulose acylate film is preferably higher than the solvent concentration in the cellulose acylate film before being contacted with the organic solvent, for effectively forming the adhesive layer.

The residual solvent amount in the cellulose acylate film before being contacted with the organic solvent is preferably, but not particularly limited, from 0 to 10% by weight, more preferably from 0 to 5% by weight, still more preferably from 0 to 2% by weight, from the viewpoint of the film retardation expression.

Further, the amount of contacting with the organic solvent (coating amount) in the organic solvent contacting step is preferably, but not particularly limited, from 0.5 to 30 mL, more preferably from 1 to 15 mL, still more preferably from 2 to 10 mL, per m$^2$. In the case where the amount is 0.5 mL or more per m$^2$, there results sufficient adhesiveness and uniform contact with no unevenness, thus such amount being preferred. The amount of 30 mL per m$^2$ or less is preferred from the viewpoint that the drying load may be reduced, that retardation change after contacting with the organic solvent may be suppressed, and that curling of the film may be reduced.

(Drying Step)

The cellulose acylate film thus contacted with an organic solvent in the manner as above is then conveyed into a drying zone, in which drying of the film is completed while the film being conveyed with rolls or while being clipped at both edges with a tenter. Additionally, in the case where the organic solvent contacting step is performed prior to the above-mentioned dry stretching step or heat treatment step, the subsequent step may be the drying step. The drying step may be a method of applying hot air or warm air or low-gas concentration air to the cellulose acylate film while being conveyed in the zone; a method of irradiating the film with heat rays; or a method of contacting the film with a heated roll, etc. Of these methods, the method of applying hot air or warm air or low-gas concentration air to the film is preferred. The temperature of the dry air is preferably, but not particularly limited, from −10 to 140° C., more preferably from 25 to 120° C., still more preferably from 30 to 100° C., most preferably from 40 to 80° C. When the drying temperature is −10° C. or higher, then the film may be dried at a sufficient drying speed; and when 140° C. or lower, then the adhesiveness of the film may be effectively enhanced.

The residual solvent amount in the thus-dried cellulose acylate film is preferably equal to or less than the residual solvent amount of the cellulose acylate film before the organic solvent contacting treatment; and in the case where the organic solvent contacting step is performed after the dry stretching step or the heat treatment step, the residual solvent amount in the dried film is preferably from 0 to 5% by weight, more preferably from 0 to 3% by weight, still more preferably from 0 to 2% by weight, most preferably from 0 to 1% by weight. The ratio ($W_1/W_0$) of the weight of the cellulose acylate film after the drying step ($W_1$) to the weight of the cellulose acylate film before the organic solvent contacting treatment ($W_0$) is preferably, but is not particularly limited, from 0.97 to 1.03, more preferably from 0.98 to 1.02, still more preferably from 0.99 to 1.01, from the viewpoint of reducing curling of the dried film.

Also, the ratio ($Re_1/Re_0$) of the retardation of the cellulose acylate film after the drying treatment ($Re_1$) to the retardation of the cellulose acylate film before the organic solvent contacting treatment ($Re_0$) is preferably, but is not particularly limited, from 0.8 to 1.2, more preferably from 0.9 to 1.1, still more preferably from 0.95 to 1.05. Within the range, the surface state of the film is good in many cases.

Further, the ratio ($HZ_1/HZ_0$) of the haze of the cellulose acylate film after the drying treatment ($HZ_1$) to the haze of the cellulose acylate film before the organic solvent contacting treatment ($HZ_0$) is preferably, but is not particularly limited, from 0.1 to 1.5, more preferably from 0.3 to 1.4, still more preferably from 0.5 to 1.3. In addition, the haze of the cellulose acylate film after the drying treatment ($HZ_1$) is preferably 1.0% or less, more preferably 0.7% or less, still more preferably 0.5% or less. Within the range, when incorporated in a liquid crystal display device, the cellulose acylate film of the invention can reduce light leakage upon black display and, in addition, bleed-out of the additives in the film and bleed-out of the additives with the lapse of time may be suppressed. Further, adhesiveness to a polarizer may be appropriately adjusted.

<<Cellulose Acylate Film>>
(Characteristics of the Cellulose Acylate Film of the Invention)

According to the production method of the invention, a cellulose acylate film having an adequately adjusted retardation and having excellent adhesiveness to a polarizerl can be obtained.

(Retardation)

In this specification, Re and Rth (unit, m) are determined according to the following method. First, the film to be analyzed is conditioned at 25° C. and a relative humidity of 60% for 24 hours. Then, using a prism coupler (MODEL 2010 Prism Coupler, manufactured by Metricon) at 25° C. and a relative humidity of 60%, the mean refractive index (n) of the sample, as represented by the following formula (2), is determined with a 532 nm solid laser.

$$n=(n_{TE}\times 2+n_{TM})/3 \quad \text{Formula (2)}$$

In the above formula, $n_{TE}$ is the refractive index measured with polarized light in the direction of the film face; and $n_{TM}$ is the refractive index measured with polarizing light in the normal direction to the film face.

In this specification, Re(λnm) and Rth(λnm) indicate the in-plane retardation and the thickness-direction retardation of a film at a wavelength λ (unit: nm), respectively. Re(λnm) is determined, using KOBRA 21 ADH or WR (manufactured by Oji Scientific Instruments), with light having a wavelength of λnm given to a film in the normal direction thereof.

In the case where the film to be analyzed is a monoaxial or biaxial refractive index ellipsoid, its Rth(λnm) is calculated as follows:

Rth(λnm) is calculated with KOBRA 21ADH or WR based on the retardation that is obtained by measuring the Re(λnm) at a total of 6 points in directions inclined every 10° from the normal direction thereof to +500 from the normal line relative to the film surface around an in-plane slow axis (determined by KOBURA 21ADH or WR) as an inclination axis (rotation axis) (in the case where the film does not have a slow axis, any desired in-plane direction of the film may be taken as the rotation axis) for an incident light of a wavelength of λnm entering from each of the directions of inclination, an average refraction index, and inputted thickness.

In the above, when no specific description is given to λ and when only Re and Rth are shown, the data are obtained by using a light having a wavelength of 590 nm. For the film having a tilt angle at which the retardation thereof is zero with the in-plane slow axis from the normal direction taken as the rotation axis, its retardation at a tilt angle larger than that tilt angle is converted into the corresponding negative value and then calculated by KOBRA 21ADH or WR.

Additionally, with the slow axis taken as the tilt axis (rotation axis) (in the case where the film does not have a slow axis, any desired in-plane direction of the film may be taken as the rotation axis), a retardation is determined in any desired two tilt directions and, based on the found data and the mean refractive index and the inputted film thickness, Rth of the film may also be calculated according to the following formulae (3) and (4):

$$Re(\theta) = \left[ nx - \frac{(ny \times nz)}{\sqrt{\left(ny\sin\left(\sin^{-1}\left(\frac{\sin(-\theta)}{nx}\right)\right)\right)^2 + \left(nz\cos\left(\sin^{-1}\left(\frac{\sin(-\theta)}{nx}\right)\right)\right)^2}} \right] \times \frac{d}{\cos\left(\sin^{-1}\left(\frac{\sin(-\theta)}{nx}\right)\right)} \quad \text{Formula (3)}$$

In the above formula, Re(θ) represents a retardation in the direction tilted by an angle θ from the normal direction; nx represents the refractive index in the in-plane slow axis direction; ny represents the refractive index in the direction perpendicular to the in-plane nx; nz represents the refractive index in the direction perpendicular to nx and ny; and d represents the thickness of the film.

$$Rth = ((nx+ny)/2 - nz) \times d \quad \text{Formula (4)}$$

In the case where the film to be analyzed cannot be expressed as a monoaxial or biaxial refractive index ellipsoid, or in the case where the film to be analyzed has no optical axis, then its Rth(λnm) may be calculated as follows:

Rth(λnm) is calculated with KOBRA 21ADH or WR based on the retardation that is obtained by measuring the Re (λnm) at a total of eleven points in directions inclined every 10° from −50° up to +50° from the normal line relative to the film surface around an in-plane slow axis (determined by KOBURA 21ADH or WR) as an inclination axis (rotation axis) for an incident light of a wavelength of λnm entering from each of the directions of inclination, an average refraction index and inputted thickness. By inputting the value of these average refraction indices and thickness, KOBRA 21ADH or WR calculates nx, ny, and nz. Further, Nz=(nx−nz)/(nx−ny) is calculated from the calculated nx, ny, and nz.

Also, in the above measurement, as the average refractive index, catalogue values with various optical films described in Polymer Hand-book (JOHN WILEY & SONS, INC.) may be employed. With polymers having unknown average refractive index, the value may be obtained by measuring according to the above-mentioned method. Average refractive indices of major optical films are illustrated below: cellulose acylate (1.48); cycloolefin polymer (1.52); polycarbonate (1.59); polymethyl methacrylate (1.49); and polystyrene (1.59).

In the case of using the cellulose acylate film of the invention for a VA-mode liquid crystal panel, the film preferably satisfies the following formulae (I) and (II):

$$30 \leq Re \leq 85 \quad \text{Formula (I)}$$

$$80 \leq Rth \leq 300 \quad \text{Formula (II)}$$

In the above formulae, Re and Rth represent an in-plane retardation and a thickness-direction retardation (unit: nm), respectively.

Also, in the case of using the cellulose acylate film of the invention for an IPS-mode liquid crystal panel, the film preferably satisfies the following formula (III):

$$60 \leq Re \leq 400 \quad \text{Formula (III)}$$

In the above formulae, Re and Rth represent an in-plane retardation and a thickness-direction retardation (unit: nm), respectively.

More preferably, the film satisfies the following formula (IV):

$$-0.5 \leq Rth \leq 0.5 \quad \text{Formula (IV)}$$

(Humidity Dependency)

In the invention, the humidity dependency of Re (ΔRe) and the humidity dependency of Rth (ΔRth) are calculated from the in-plane and thickness-direction retardation at a relative humidity H (unit: %), Re (H %) and Rth (H %), according to the following formulae:

$$\Delta Re = Re(10\%) - Re(80\%)$$

$$\Delta Rth = Rth(10\%) - Rth(80\%)$$

Re (H %) and Rth (H %) are the values determined as follows: The film to be analyzed is conditioned at 25° C. and a relative humidity H % for 24 hours, then measured at 25° C. and relative humidity H % at a wavelength of 590 mm, followed by calculating in the same manner as mentioned above. Additionally, mere expression Re alone, not accompanied by a value of relative humidity, means the data measured at a relative humidity of 60%.

The retardation values of the cellulose acylate film of the invention, as measured under different humidity conditions, preferably satisfy the following relational formulae:

$$|\Delta Re| < 30 \text{ and}$$

$$|\Delta Rth| < 50.$$

More preferably, they satisfy the following relational formulae:

$$|\Delta Re| < 10 \text{ and}$$

$$|\Delta Rth| < 40.$$

Still more preferably, they satisfy the following relational formulae:

$$|\Delta Re| < 5 \text{ and}$$

$$|\Delta Rth| < 30.$$

Most preferably, they satisfy the following relational formulae:

$$|\Delta Re|<3 \text{ and}$$

$$|\Delta Rth|<20.$$

Controlling the retardation values under different humidity conditions makes it possible to reduce the retardation change under varying external environments, thereby providing liquid crystal display devices of high reliability.
(Slow Axis)

Preferably, with the cellulose acylate film of the invention, the angle, θ, between the conveying direction in the production of the film and the slow axis of Re of the film is 0±10° or 90±10°, more preferably 0±5° or 90±5°, still more preferably 0±3° or 90±3° and, in some cases, preferably 0±1° or 90±1°, most preferably 90±1°.
(In-Plane Orientation)

In the invention, the in-plane orientation of the cellulose acylate film at the portion from 0 to 3 μm in depth from the surface thereof can be determined by: cutting the film from the side opposite to the side to be measured to a film thickness of 3 μm from the surface to be measured, to thereby prepare a sample; introducing a polarized light into the film using a Fourier Transform Infrared Spectrophotometer (NICOLET 6700, manufactured by Thermo Fisher); and measuring the absorption peak area of the transmission spectrum in the vicinity of 1750 cm$^{-1}$. Specifically, it can be determined by the ratio $(I_{12}/I_{11})$ wherein $I_{11}$ represents the area when a polarized light in the in-plane slow axis direction is introduced into the film, and $I_{12}$ represents the area when a polarized light perpendicular to the former polarized light is introduced into the film. The smaller the absolute value of this value, the nearer to non-orientation state is the in-plane state. Likewise, the in-plane orientation $(I_{22}/I_{21})$ of the film in the portion from 3 to 10 μm in depth from the surface can be determined by cutting the film to a depth of 3 μm from the measured surface and, further, cutting from the opposite side of the measured surface to a thickness of 7 μm to prepare a sample, The cellulose acylate film of the invention is characterized in that I112/I111 is smaller than $|I_{22}/I_{21}|$, and $|I_{22}/I_{21}|/|I_{12}/I_{11}|$ is preferably more than 1.00, more preferably from 1.05 to 1.80, still more preferably from 1.10 to 1.40.

The in-plane orientation may also be determined by observing in a reflection mode by applying an ATR prism comprising diamond, ZnSe or KRS-5 to the above-mentioned spectrophotometer (e.g., MKII Golden Gate Single Reflection ATR System, manufactured by Specac). In this case, the measuring depth from the prism-contacted surface can be adjusted to be about 3 μm by appropriately selecting the prism material or the incident angle of the measuring light.
(Surface Roughness)

In the invention, the surface roughness of the cellulose acylate film can be measured by measuring the surface of a sample using an atomic force microscope (AFM, SPA400, manufactured by SII Nanotechnology). At least one side of the cellulose acylate film of the invention has a surface roughness of preferably from 5 to 300 nm. The surface roughness is preferably 5 nm or more from the standpoint of adhesiveness to a polarizer, and is preferably 300 nm or less from the standpoint of reducing haze. The surface roughness is more preferably from 5 to 100 nm, still more preferably from 6 to 30 nm, most preferably from 6 to 13 nm.
(Tear Strength)

In the invention, the tear strength (Elmendorf tearing method) is determined by cutting out two 64 mm×50 mm samples, with one being cut out so that the longitudinal direction is parallel to the slow axis of the film and the other being cut out so that the longitudinal direction is perpendicular to the slow axis and, after conditioning the film at 25° C. and a relative humidity of 60% for 2 hours, conducting measurement using a light weight tearing tester, with the value whichever is smaller being taken as the tear strength of the film.

The tear strength of the cellulose acylate film of the invention is preferably from 5 to 50 g, more preferably from 10 to 40 g, still more preferably from 12 to 30 g.
(Surface Waviness Height)

In the invention, the surface waviness is determined as follows: A 30 cm×30 cm sample is cut out from the film, the cut-out sample is placed on a horizontal and smooth bed, and the height of waving wrinkles accompanying flatness failure (distance from the bed to the film) is measured using a slide gauge, with the maximum value being taken as the surface waviness height.

The surface waviness height of the cellulose acylate film of the invention is preferably from 0 to 5 mm, more preferably from 0 to 3 mm, still more preferably from 0 to 2 mm.
(Haze)

In the invention, the haze of the cellulose acylate film is measured by using, after conditioning the film at 25° C. and a relative humidity of 60% for 24 hours, a haze meter (NDH 2000; manufactured by Nippon Denshoku Industries Co., Ltd.).

In the invention, the cellulose acylate film having been subjected to heat treatment preferably has a smaller haze, specifically 1.0% or less, more preferably 0.7% or less, still more preferably 0.5% or less, most preferably 0.3% or less.
(Film Thickness)

Preferably, the thickness of the cellulose acylate film of the invention is from 20 μm to 180 μm, more preferably from 30 μm to 160 μm, still more preferably from 40 μm to 120 μm. When the film thickness is 20 μm or more, the film is favorable in the point of the handlability thereof in working the film into polarizing plate or the like and of the ability thereof to prevent curling of polarizing plate. Also, the thickness unevenness of the cellulose acylate film of the invention is preferably from 0 to 2% both in the film-conveying direction and in the width direction, more preferably from 0 to 1.5%, still more preferably from 0 to 1%.
(Moisture Permeability)

In the invention, the moisture permeability is a value determined by covering a cup retaining calcium chloride with a film to be tested to tightly close the cup, leaving it for 24 hours at 40° C. and a relative humidity of 90%, and calculating based on the change in weight (g/(m$^2$·day)) before and after the conditioning. Additionally, the moisture permeability increases with the increase in temperature and humidity but, regardless of the conditions, the descending order of moisture permeability among films is unchanged. Therefore, in the invention, the value of change in weight at 40° C. and a relative humidity of 90% is employed as the base for the moisture permeability. Also, since the moisture permeability decreases with the increase in film thickness and increases with the decrease in film thickness, the actually measured moisture permeability is multiplied by the film thickness, then divided by 80. In the invention, the thus obtained value is taken as "moisture permeability in terms of the film having a thickness of 80 μm".

The moisture permeability of the cellulose acylate film of the invention is preferably 100 g/(m$^2$·day) or more in terms of the film having a thickness of 80 μm. Having the moisture permeability of 100 g/(m$^2$·day) or more in terms of the film having a thickness of 80 μm, the film may be readily stuck to a polarizer directly. The moisture permeability in terms of the film having a thickness of 80 μm is more preferably from 100 to 1500 g/(m²·day), still more preferably from 200 to 1000 g/(m²·day), yet more preferably from 300 to 800 g/(m²·day).

In the case where the cellulose acylate film of the invention is used as an outer protective film that is not disposed between a polarizer and a liquid crystal cell as in the embodiment described below, the moisture permeability of the cellulose acylate film of the invention is preferably less than 500 g/(m²·day) in terms of the film having a thickness of 80 μm, more preferably from 100 to 450 g/(m²·day), still more preferably from 100 to 400 g/(m²·day), most preferably from 150 to 300 g/(m²·day). Within the range, the durability of polarizing plate to moisture or to wet heat may be improved, and liquid crystal display devices of high reliability can be provided.

(Sound Wave Velocity (Sound Speed))

In the invention, the direction in which the sound wave velocity is the maximum through the film is determined as follows: The film to be analyzed is conditioned at 25° C. and a relative humidity of 60% for 24 hours, then this is analyzed using an orientation analyzer (SST-2500, by Nomura Shoji) to determine the direction thereof in which the ultrasonic pulse longitudinal wave velocity is the maximum.

(Constitution of Cellulose Acylate Film)

The cellulose acylate film of the invention may have a single-layered structure or a multi-layered structure, but preferably has a single-layered structure. The "single-layered" film as referred to herein means a one-sheet type polymer film, not a laminate film of plural films stuck together. This includes a one-sheet type polymer film produced by a successive casting process or a co-casting process from plural cellulose acylate solutions. In this case, by suitably controlling the kind and the amount of additives, the molecular distribution of the polymer and the kind of the polymer, a polymer film having a distribution in the thickness direction may be produced. One-sheet film may have various functional parts such as an optically-anisotropic part, an antiglare part, a gas-barrier part, a moisture-resistant part, etc.

(Surface Treatment)

The cellulose acylate film of the invention may be suitably surface-treated so as to improve its adhesion to various functional layers (e.g., undercoat layer, back layer, and optically-anisotropic layer). The surface treatment includes glow discharge treatment, UV irradiation treatment, corona treatment, flame treatment, saponification treatment (acid saponification treatment, alkali saponification treatment), with glow discharge treatment and alkali saponification treatment being preferred. The "glow discharge treatment" is a treatment of processing a film surface with plasma in the presence of a plasma-exciting vapor. The details of the surface treatment are described in *Journal of Technical Disclosure of Japan Institute of Invention and Innovation* (*JIII*) (No. 2001-1745, published by the JIII on Mar. 15, 2001), and may properly be applied to the invention.

For improving the adhesiveness between the film surface and a functional layer thereon, an undercoat layer (adhesive layer) may be provided on the cellulose acylate film of the invention, in addition to the surface treatment or in place of the surface treatment thereof. The undercoat layer is described in *JIII Journal of Technical Disclosure* (No. 2001-1745, published by the JIII on Mar. 15, 2001), p. 32, which may properly be applied to the invention. The functional layers that may be provided on a cellulose acylate film are described in *JIII Journal of Technical Disclosure* (No. 2001-1745, published by the JIII on Mar. 15, 2001), pp. 32-45, and they may properly be applied to the cellulose acylate film of the invention.

<<Retardation Film>>

A retardation film of the invention has at least one cellulose acylate film of the invention.

The cellulose acylate film of the invention may be used as a retardation film. Additionally, "retardation film" means an optical material having optical anisotropy which is used generally in display devices such as liquid crystal display devices, and it has the same meaning as that of retardation plate, optical compensatory film, optical compensatory sheet, etc. In a liquid crystal display device, the retardation film is used for the purpose of increasing the display panel contrast and of improving the viewing angle characteristics and the color of the device.

Retardation can be controlled as desired and a retardation film having excellent adhesion to a polarizer can be prepared by using the cellulose acylate film of the invention.

A plurality of the cellulose acylate films of the invention may be laminated, or the cellulose acylate film of the invention may be laminated with any other film not falling within the scope of the invention, thereby appropriately controlling Re and Rth of the resulting laminate, and the laminate may be used as a retardation film. The film lamination may be performed by the use of a sticky paste or an adhesive.

In some cases, the cellulose acylate film of the invention may be used as a support of a retardation film, and an optically-anisotropic layer of liquid crystal or the like may be provided on it to construct a retardation film. The optically-anisotropic layer to be applied to the retardation film of the invention may be formed of, for example, a liquid-crystalline compound-containing composition or a birefringent polymer film, or may be formed of the cellulose acylate film of the invention. In the case where the above-mentioned production method of the invention is performed as the post-step after the step of forming the optically-anisotropic layer, it is desirable that the organic solvent is contacted with the other surface of the film opposite to the surface thereof on which the optically-anisotropic layer is formed.

The liquid-crystalline compound is preferably a discotic liquid-crystalline compound or a rod-shaped liquid-crystalline compound.

[Discotic Liquid-Crystalline Compound]

Examples of discotic liquid-crystalline compounds usable in the invention are described in various documents (e.g., C. Destrade et al., *Mol. Cryst. Liq. Cryst.*, Vol. 71, p. 111 (1981); *Quarterly Journal of General Chemistry*, edited by the Chemical Society of Japan, No. 22, Ekisho No Kagaku (Chemistry of Liquid Crystal), Chap. 5, Chap. 10, Sec. 2 (1994); B. Kohne et al., *Angew. Chem. Soc. Chem. Comm.*, p. 1794 (1985): J. Zhang et al., *J. Am. Chem. Soc.*, Vol. 116, p. 2655 (1994)).

In the optically-anisotropic layer, the discotic liquid-crystalline molecules are preferably fixed as aligned. Most preferably, the molecules are fixed through polymerization reaction. Polymerization of discotic liquid-crystalline molecules is described in JP-A-8-27284. For fixing the discotic liquid-crystalline molecules through polymerization, the discotic core of the discotic liquid-crystalline molecules must be substituted with a polymerizing group. However, when a polymerizing group is bonded directly to the discotic core, the molecules could hardly keep their alignment state during polymerization. Accordingly, a linking group is introduced between the discotic core and the polymerizing group. Polymerizing group-having discotic liquid-crystalline molecules are described in JP-A-2001-4387.

[Rod-Shaped Liquid-Crystalline Compound]

Examples of rod-shaped liquid-crystalline compounds usable in the invention include azomethines, azoxy compounds, cyanobiphenyls, cyanophenyl esters, benzoates, phenyl cyclohexanecarboxylates, cyanophenylcyclohexanes, cyano-substituted phenylpyrimidines, alkoxy-substituted phenylpyrimidines, phenyldioxanes, tolanes, and alkenylcyclohexylbenzonitriles. The rod-shaped liquid-crystalline compound for use herein is not limited to these low-molecular liquid-crystalline compounds but includes high molecular liquid-crystalline compounds.

In the optically-anisotropic layer, the rod-shaped liquid-crystalline molecules are preferably fixed as aligned. Most preferably, the molecules are fixed through polymerization reaction. Examples of the polymerizable rod-shaped liquid-crystalline compound usable in the invention are described, for example, in *Makromol. Chem.*, Vol. 190, p. 2255 (1989); *Advanced Materials*, Vol. 5, p. 107 (1993); U.S. Pat. Nos. 4,683,327, 5,622,648, and 5,770,107, WO95/22586, WO95/24455, WO97/00600, WO98/23580, WO98/52905, JP-A-1-272551, JP-A-6-16616, JP-A-7-110469, JP-A-11-80081, and JP-A-2001-328973.

<<Polarizing Plate>>

A polarizing plate of the invention has at least one cellulose acylate film of the invention.

The cellulose acylate film or the retardation film of the invention may be used as a protective film for polarizing plate (polarizing plate of the invention). The polarizing plate of the invention comprises a polarizer and two polarizing plate-protective films that protect both surfaces of the polarizer, in which the cellulose acylate film or the retardation film of the invention is particularly preferably used as at least one polarizing plate-protective film.

In the case where the cellulose acylate film of the invention is used as the above-mentioned, polarizing plate-protective film, it is desirable that the cellulose acylate film of the invention is subjected to the above-mentioned surface treatment (as in JP-A-6-94915 and JP-A-6-118232) for hydrophilizing its surface. For example, the film is preferably subjected to glow discharge treatment, corona discharge treatment or alkali saponification treatment. As the surface treatment, alkali saponification treatment is most preferably employed.

The polarizer may be prepared by, for example, dipping a polyvinyl alcohol film in an iodine solution and stretching it. In the case where such a polarizer prepared by dipping a polyvinyl alcohol film in an iodine solution and stretching it is used, the cellulose acylate film of the invention may be directly stuck to both surfaces of the polarizer with an adhesive, with its surface-treated face being inside of the resulting structure. In the production method of the invention, it is desirable that the cellulose acylate film is directly stuck to a polarizer in that manner. The adhesive may be an aqueous solution of polyvinyl alcohol or polyvinyl acetal (e.g., polyvinyl butyral), or a latex of a vinylic polymer (e.g., polybutyl acrylate). An aqueous solution of a completely-saponified polyvinyl alcohol is especially preferred for the adhesive.

In a liquid-crystal display device, in general, a liquid-crystal cell is provided between two polarizing plates. The device therefore has four polarizing plate-protective films. The cellulose acylate film of the invention may be used as any of those four polarizing plate-protective films, but preferably it is used especially advantageously as the protective film to be disposed between the polarizer and the liquid-crystal layer (liquid-crystal cell) in the liquid-crystal display device. The protective film to be disposed on the opposite side to the cellulose acylate film of the invention with a polarizer sandwiched therebetween may be provided with a transparent hard coat layer, an antiglare layer, an antireflection layer or the like. In particular, the cellulose acylate film of the invention is favorably used as a polarizing plate-protective film of the outermost surface on the display side of liquid crystal display device.

<<Liquid Crystal Display Device>>

The cellulose acylate film, the retardation film and the polarizing plate of the invention may be used in liquid crystal display devices of various display modes. Various liquid crystal modes in which the film is used are described below. Of those modes, the cellulose acylate film, the retardation film, and the polarizing plate of the invention are especially favorably used in VA-mode and IPS-mode liquid crystal display devices. The liquid crystal display devices may be any of transmission-type, reflection-type and semi-transmission-type ones.

(TN-Mode Liquid Crystal Display Device)

The cellulose acylate film of the invention may be used as a support of the retardation film in a TN-mode liquid crystal display device having a TN-mode liquid crystal cell. TN-mode liquid crystal cells and TN-mode liquid crystal display devices are well known from the past. The retardation film for use in TN-mode liquid crystal display devices is described in JP-A-3-9325, JP-A-6-148429, JP-A-8-50206, JP-A-9-26572; and in Mori et al's reports (*Jpn. J. Appl. Phys.*, Vol. 36 (1997), p. 143; *Jpn. J. Appl. Phys.*, Vol. 36 (1997), p. 1068).

(STN-Mode Liquid Crystal Display Device)

The cellulose acylate film of the invention may be used as a support of the retardation film in an STN-mode liquid crystal display device having an STN-mode liquid crystal cell. In an STN-mode liquid crystal display device, in general, the rod-shaped liquid-crystalline molecules in the liquid crystal cell are twisted within a range of from 90 to 360 degrees, and the product ($\Delta nd$) of the refractivity anisotropy ($\Delta n$) of the rod-shaped liquid-crystalline molecules and the cell gap (d) falls within a range of from 300 to 1500 nm. Retardation films for use in STN-mode liquid crystal display devices are described in JP-A-2000-105316.

(VA-Mode Liquid Crystal Display Device)

The cellulose acylate film of the invention may particularly advantageously be used as the retardation film or as a support of the retardation film in a VA-mode liquid crystal display device having a VA-mode liquid crystal cell. The VA-mode liquid crystal display device may be a domain-division system device, for example, as in JP-A-10-123576. The polarizing plate with the cellulose acylate film of the invention in these embodiments contributes to viewing angle expansion and contract improvement.

(IPS-Mode Liquid Crystal Display Device and ECB-Mode Liquid Crystal Display Device)

The cellulose acylate film of the invention is especially advantageously used as the retardation film, as a support of the retardation film or as a protective film of the polarizing plate in an IPS-mode liquid crystal display device and an ECB-mode liquid crystal display device having an IPS-mode or ECB-mode liquid crystal cell. In these modes, the liquid crystal material is aligned nearly in parallel to each other at the time of black display and, under a condition of no voltage application thereto, the liquid-crystalline molecules are aligned in parallel to the substrate face to give black display. In these embodiments, the polarizing plate using the cellulose acylate film of the invention contributes to viewing angle expansion and contract improvement.

(OCB-Mode Liquid Crystal Display Device and Han-Mode Liquid Crystal Display Device)

The cellulose acylate film of the invention is also advantageously used as a support of the retardation film in an OCB-mode liquid crystal cell-having OCB-mode liquid crystal display device or a HAN-mode liquid crystal cell-having HAN-mode liquid crystal display device. It is desirable that, in the retardation film in an OCB-mode liquid crystal display device or a HAN-mode liquid crystal display device, the direction in which the absolute value of the retardation of the film is the smallest is neither the in-plane direction nor the normal direction of the retardation film. The optical properties of the retardation film for use in an OCB-mode liquid crystal display device or a HAN-mode liquid crystal display device depend on the optical properties of the optically-anisotropic layer, the optical properties of the support, and the configuration of the optically-anisotropic layer and the support of the film. Retardation films for use in an OCB-mode liquid crystal display device or a HAN-mode liquid crystal display device are described in JP-A-9-197397. In addition, they are also described in Mori et al's report (*Jpn. J. Appl Phys.*, Vol. 38 (1999), p. 2837).

(Reflection-Type Liquid Crystal Display Device)

The cellulose acylate film of the invention may be advantageously used as the retardation film of TN-mode, STN-mode, HAN-mode or GH (guest-host)-mode reflection-type liquid crystal display devices. These display modes are well known from the past. TN-mode reflection-type liquid crystal display devices are described in JP-A-10-123478, WO98/48320, Japanese Patent 3022477. Retardation films for use in reflection-type liquid crystal display devices are described in WO00/65384.

(Other Liquid Crystal Display Devices)

The cellulose acylate film of the invention may be advantageously used as a support of the retardation film in an ASM (axially symmetric aligned microcell)-mode liquid crystal cell-having ASM-mode liquid crystal display device. The ASM-mode liquid crystal cell is characterized in that the cell thickness is held by a position-controllable resin spacer. The other properties of the cell are the same as those of the TN-mode liquid crystal cell. ASM-mode liquid crystal cells and ASM-mode liquid crystal display devices are described in Kume et al's report (Kume et al., *SID 98 Digest* 1089 (1998)).

(Hard Coat Film, Antiglare Film, Antireflection Film)

In some cases, the cellulose acylate film of the invention may be applied to a hard coat film, an antiglare film, and an antireflection film. For the purpose of improving the visibility of LCD, PDP, CRT, EL and the like flat panel displays, any or all of a hard coat layer, an antiglare layer, and an antireflection layer may be given to one face or both faces of the cellulose acylate film of the invention. Preferred embodiments of such antiglare films and antireflection films are described in detail in *JIII Journal of Technical Disclosure* (No. 2001-1745, published by the JIII on Mar. 15, 2001), pp. 54-57, and these are also preferred for the cellulose acylate film of the invention.

EXAMPLES

The characteristic aspects of the invention are described in more detail with reference to the following Examples. In Examples, the material used, its amount and the ratio, the details of the treatment and the treatment order may suitably be modified or changed without overstepping the scope of the invention. Accordingly, the invention should not be limitatively interpreted by the Examples mentioned below.

<<Measurement Methods>>

Measurement methods and evaluation methods for the properties used are described below.

[Glass Transition Temperature (Tg)]

20 mg of an un-heat-treated cellulose acylate film is put into a sample pan for DSC, heated in a nitrogen atmosphere at a rate of 10° C./min from 30° C. up to 120° C., kept as such for 15 minutes, and then cooled to 30° C. at a rate of −20° C./min. Then, this is again heated from 30° C. up to 250° C., and the temperature at which the base line of the temperature profile of the sample begins to deviate from the low-temperature side is referred to as glass transition temperature of the film.

[Melting Temperature ($Tm_0$)]

20 mg of an un-heat-treated cellulose acylate film is put into a sample pan for DSC, heated in a nitrogen atmosphere at a rate of 10° C./min from 30° C. up to 120° C., kept as such for 15 minutes, and then cooled to 30° C. at a rate of −20° C./min. Then, this is again heated from 30° C. up to 300° C., and the temperature at which the endothermic peak appearing during the heating is referred to as the melting temperature of the film.

[Crystallization Temperature (Tc)]

20 mg of an un-heat-treated cellulose acylate film is put into a sample pan for DSC, heated in a nitrogen atmosphere at a rate of 10° C./min from 30° C. up to 120° C., kept as such for 15 minutes, and then cooled to 30° C. at a rate of −20° C./min. Then, this is again heated from 30° C. up to 300° C., and the temperature at which the exothermic peak appearing during the heating is referred to as the crystallization temperature of the film.

[Degree of Substitution]

The degree of acyl substitution of the cellulose acylate film is determined by $^{13}$C-NMR according to the method described in *Carbohydr. Res.*, 273 (1995), 83-91 (Tezuka, et al.).

[Retardation]

The film to be analyzed is sampled at five points in the cross direction thereof (center, and both edges (at the position of 5% of the overall width from both edges), and two intermediates between the center and the edge) at intervals of 100 m in the longitudinal direction, thereby giving samples having a size of 5 cm×5 cm. These samples are tested according to the method mentioned above. The data of individual points are averaged to determine Re, Rth, ΔRe, ΔRth, and the in-plane slow axis direction.

[In-Plane Orientation]

Sampling is performed in the same manner as in measurement of retardation, and the resulting samples are cut according to the aforementioned method, followed by performing the measurement. Thus, $|I_{12}/I_{11}|$ and $|I_{22}/I_{21}|$ are determined from the average values and, further, $|I_{22}/I_{21}|/|I_{12}/I_{11}|$ is determined.

[Surface Roughness]

Sampling is performed in the same manner as in measurement of retardation, and a 100 μm×100 μm area of each of the resulting samples is subjected to the same measurement, and the average value is referred to as the surface roughness.

[Haze]

The film is sampled in the same manner as that in measurement of retardation. The samples are conditioned at 25° C. and relative humidity of 60% for 24 hours, and analyzed with a haze meter (NDH 2000; manufactured by Nippon Denshoku Industries Co., Ltd.). The data are averaged to give the haze of the sample.

[Degree of Polarization]

Two polarizing plates are placed one upon another to determine the transmittance (Tp) with their absorption axes kept parallel to each other, and the transmittance (Tc') with their absorption axes kept perpendicular to each other. The degree of polarization (P) is computed according to the following formula:

Degree of polarization $P=((Tp-Tc')/(Tp+Tc'))^{0.5}$

<<Synthesis of Cellulose Acetate Propionate>>

150 g of cellulose (hardwood pulp) and 75 g of acetic acid are added to 5 L separable flask equipped with a reflux device which is a reaction vessel, and the mixture is vigorously stirred for 2 hours while the flask is heated in an oil bath at 60° C. The cellulose subjected to the pre-treatment as above is swollen and dissolved to have a fluffy shape. Then, the reaction vessel is left and cooled in an iced water bath at 2° C. for 30 min.

Separately, a mixture of 1,545 g of a propionic anhydride and 10.5 g of sulfuric acid is prepared as an acylating agent, and cooled to −30° C. After that, the mixture is added at once to the reaction vessel in which the cellulose subjected to the pre-treatment is placed. After 30 minutes, exterior temperature is gradually increased in such a manner that interior temperature is adjusted to be 25° C. when 2 hours have passed after adding the acylating agent. The reaction vessel is cooled in the iced water bath at 5° C. in such a manner that the interior temperature is adjusted to be 10° C. when 0.5 hours have passed after adding the acylating agent, and adjusted to be 23° C. when 2 hours have passed after adding the acylating agent. Then, the mixture is stirred again for 3 hours while the interior temperature of the vessel is kept at 23° C. The reaction vessel is cooled in the iced water bath at 5° C., and 120 g of acetic acid having a water content of 25% by weight cooled to 5° C. is added to the vessel over 1 hour. The interior temperature is increased to 40° C. and the mixture is stirred for 1.5 hours. Subsequently, a solution in which magnesium acetate tetrahydrate is dissolved in an amount twice as much as sulfuric acid in terms of mol in acetic acid having water content of 50% by weight is added to the reaction vessel, and then the mixture is stirred for 30 min. To the mixture, 1 L of acetic acid having a water content of 25% by weight, 500 mL of acetic acid having a water content of 33% by weight, 1 L of acetic acid having a water content of 50% by weight, and 1 L of water are added in such an order, thereby precipitating cellulose acetate propionate. The thus-obtained precipitate of cellulose acetate propionate is washed with warm water. By varying a washing condition in this procedure, cellulose acetate propionate having different amount of residual sulfuric acid radical can be obtained. The content of sulfuric acid residue can be measured according to ASTM D-817-96. After washing, the precipitate of cellulose acetate propionate is stirred in a 0.005% by weight calcium hydroxide aqueous solution at 20° C. for 0.5 hours. Subsequently, the precipitate of cellulose acetate propionate is washed again with water till the pH of a washing solution becomes 7, followed by vacuum drying at 70° C.

According to $^1$H-NMR and GPC measurement, the thus-obtained cellulose acetate propionate has an acetylation degree of 0.30, a propionylation degree of 2.63, and a polymerization degree of 320. Other cellulose acylates usable in the invention may also be produced in the same manner as described above.

<<1>> Production and Evaluation of Cellulose Acylate Film
(Preparation of Polymer Solution)
1) Cellulose Acylate Of the following cellulose acylates A to J, those described in Table 1 or 2 are selected and used. Each cellulose acylate is heated and dried at 120° C. to have a water content of 0.5% by weight or less. 20 parts by weight of the polymer is used.

Cellulose Acylate A:

A powder of cellulose acetate having a degree of substitution of 2.86 is used. The viscosity-average polymerization degree of the cellulose acylate A is 300, the degree of 6-position acetyl substitution thereof is 0.89, the acetone extract is 7% by weight, the ratio of weight-average molecular weight/number-average molecular weight is 2.3, the water content is 0.2% by weight, the viscosity in 6% by weight dichloromethane solution is 305 mPa·s, the residual acetic acid amount is 0.1% or less by weight, the Ca content is 65 ppm, the Mg content is 26 ppm, the iron content is 0.8 ppm, the sulfate ion content is 18 ppm, the yellow index is 1.9, and the free acetic acid amount is 47 ppm. The mean particle size of the powder is 1.5 mm, with the standard deviation of 0.5 nm.

Cellulose Acylate B

A powder of cellulose acetate having a degree of substitution of 2.80 is used. The viscosity-average polymerization degree of the cellulose acylate B is 250, and the degree of 6-position acetyl substitution thereof is 0.86.

Cellulose Acylate C:

A powder of cellulose acetate having a degree of substitution of 2.94 is used. The viscosity-average polymerization degree of the cellulose acylate C is 300, and the degree of 6-position acetyl substitution thereof is 0.94.

Cellulose Acylate D:

A powder of cellulose acetate having a degree of substitution of 2.70 is used. The viscosity-average polymerization degree of the cellulose acylate D is 250, and the degree of 6-position acetyl substitution thereof is 0.84.

Cellulose Acylate E:

A powder of cellulose acetate having a degree of substitution of 2.50 is used. The viscosity-average polymerization degree of the cellulose acylate E is 220.

Cellulose Acylate F:

A powder of cellulose acetate having a degree of substitution of 2.11 is used. The viscosity-average polymerization degree of the cellulose acylate F is 210.

Cellulose Acylate G:

CAP482-20 (manufactured by Eastman Chemical Japan) is purchased, dried in the above-mentioned manner, and used as such.

Cellulose Acylate H:

A powder of cellulose acetate having a degree of acetyl substitution of 1.60 and a degree of propionyl substitution of 0.90 is used. The viscosity-average polymerization degree of the cellulose acylate H is 300.

Cellulose Acylate I:

A powder of cellulose acetate having a degree of acetyl substitution of 0.30 and a degree of propionyl substitution of 2.63 is used. The viscosity-average polymerization degree of the cellulose acylate I is 320.

Cellulose Acylate J:

CAP381-20 (manufactured by Eastman Chemical Japan) is purchased, dried in the above-mentioned manner, and used as such.

2) Solvent

Of the following solvent A and B, those described in Table 1 or 2 are selected and used. The water content of each solvent is 0.2% by weight or less.

Solvent A: Dichloromethane/methanol/butanol=83/15/2 (by weight)

Solvent B: Dichloromethane/methanol=87/13 (by weight)

3) Additives

Of the following additives A to C, those described in Table 1 or 2 are selected and used.

Additive A

Triphenyl phosphate (1.6 parts by weight)

Biphenyldiphenyl phosphate (0.8 part by weight)

Retardation-increasing agent of the following structure (1.9 parts by weight)

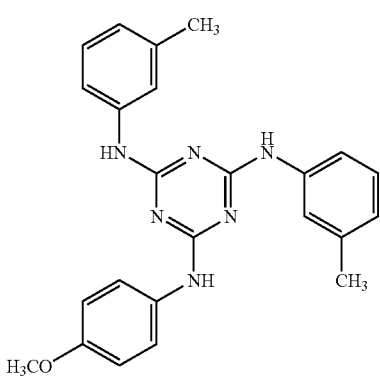 [SMILES: COc1ccc(Nc2nc(Nc3cccc(C)c3)nc(Nc3cccc(C)c3)n2)cc1]

Silicon dioxide fine particles (particle size: 20 nm; Mohs hardness: about 7) (0.02 part by weight)
Additive B
PP-29' mentioned above (2.4 parts by weight)
Retardation-increasing agent used in additive A (1.9 parts by weight)
Silicon dioxide fine particles (particle size: 20 nm; Mohs hardness: about 7) (0.02 part by weight)
Additive C
PP-29' mentioned above (2.4 parts by weight)
Retardation-increasing agent of the above-described structure (1.3 parts by weight)
4) Dissolution In Examples and Comparative Examples, the ingredients are swollen and dissolved according to the following dissolution step A.

Dissolution step A

The above-mentioned solvent and additives are put into a 400-liter stainless dissolver tank having a stirring blade and surrounded by cooling water running around it and, with stirring and dispersing them, the above-mentioned cellulose acylate is gradually added thereto. After completion of the addition, this is stirred at room temperature for 2 hours, then swollen for 3 hours, and then again stirred to give a cellulose acylate solution.

Additionally, for the stirring, a dissolver-type eccentric stirring shaft stirring at a peripheral speed of 15 m/sec (shear stress: $5 \times 10^4$ kgf/m/sec² [$4.9 \times 10^5$ N/m/sec²]), and a stirring shaft having an anchor blade at the center thereof and stirring at a peripheral speed of 1 m/sec (shear stress: $1 \times 10^4$ kgf/m/sec² [$9.8 \times 10^4$ N/m/sec²]) is used. The swelling is attained by stopping the high-speed stirring shaft and driving the anchor blade-having stirring shaft at a peripheral speed of 0.5 m/sec.

The swollen solution is heated up to 50° C. by transferring it to a jacket-covered line, and is further heated up to 90° C. under pressure of 2 MPa to thereby completely dissolve. The heating time is 15 minutes. In this occasion, the filter, the housing, and the pipe exposed to high temperatures are all made of corrosion-resistant Hastelloy alloy, and these are covered with a jacket for heat carrier circulation therethrough for heating the system to maintain the temperature.

Next, this is cooled to 36° C. to give a cellulose acylate solution.

5) Filtration

The obtained cellulose acylate solution is filtered through a paper filter having an absolute filtration accuracy of 10 μm (#63: manufactured by Toyo Filter Paper), and then through a metal sintered filter having an absolute filtration accuracy of 2.5 μm (FH025; manufactured by Pall), thereby giving a polymer solution.

(Formation of Film)

Of the following film formation process A and B, one as indicated in Table 1 or 2 is selected and used. All the cellulose acylate films produced by these film-forming processes have a residual solvent amount of 1.0% by weight or less.

Film Formation Process A

The above-mentioned polymer solution is heated to 30° C., and then cast onto a mirror-face stainless support of a drum having a diameter of 3 m, through a caster, Giesser. The surface temperature of the support is set at −5° C., the casting speed is 100 m/min, and the coating width is 200 cm. The space temperature in the entire casting zone is set at 15° C. At 50 cm before the end point of the casting zone, the cellulose acylate film thus cast and rolled is peeled off from the drum, and then both edges of the film are clipped with a pin tenter. Additionally, the residual solvent amount of the web immediately after peeling calculated according to the following formula is 280% by weight.

Residual solvent amount(% by weight)=$\{(M-N)/N\} \times 100$

In the above formula, M represents the weight of cellulose acylate film immediately before being introduced into the stretching zone, and N represents the weight of cellulose acylate film after drying the cellulose acylate film immediately before being introduced into the stretching zone, at 110° C. for 3 hours.

Subsequently, the cellulose acylate film thus held by the pin tenter is conveyed into a drying zone. In the initial stage of drying, the film is exposed to dry air at 45° C. applied thereto. Next, this is further dried at 110° C. for 5 minutes and at 140° C. for 10 minutes, thereby giving a transparent cellulose acylate film having a film thickness of 90 μm.

Film Formation Process B

The above-mentioned cellulose acylate solution is heated to 30° C., and then cast onto a mirror-face stainless support having a band length of 60 m set at 15° C. through a caster, Giesser (described in JP-A-11-314233). The casting speed is 50 m/min, and the coating width is 200 cm. The space temperature in the entire casting zone is set at 15° C. At 50 cm before the end point of the casting zone, the cellulose acylate film thus cast and rolled is peeled off from the band, and exposed to dry air at 45° C. applied thereto. Next, this is further dried at 110° C. for 5 minutes and at 140° C. for 10 minutes, thereby giving a transparent cellulose acylate film having a film thickness of 90 μm.

(Stretching)

The following stretching step A is employed.

Stretching Step A

After holding the above-formed cellulose acylate film at the both edges thereof with a tenter clip, the film is stretched in the direction perpendicular to the conveying direction within the heating zone, and wound up in a 3900-m roll form. The weight of the roll is weighed and is regarded as $W_0$. The temperature of the heating zone is set at the temperature described in Table 1 or 2, and the stretching ratio calculated based on the enlarge-shrink ratio of the tenter is adjusted to be the stretching ratio described in Table 1 or 2.

(Contact with Water Vapor)

In Table 1, the cellulose acylate film of Examples 101 and 110 is, after the stretching step, processed as follows: The film is pre-heated to 120° C., then its conveyance tension is set at 60 N/m, and the film is contacted with water vapor conditioned at 106° C. and a relative humidity of 70% for 1 minute and thereafter dried in a drying zone at 130° C. for 2 minutes, and rolled up as a roll of 3900-m film. These films are Examples 151 and 155.

Each of the cellulose films of Examples 101 and 110, and Examples 151 and 155 is tested for durability at 60° C. and a relative humidity of 90% for 24 hours, and then its retardation is measured according to the above-mentioned method. The films are compared with each other in point of the retardation change before and after the durability test. In Examples 151 and 155, the Re fluctuation width (Re after durability test-Re before durability test) and the Rth fluctuation width (Rth after durability test-Rth before durability test) both lower to from 5 to 70% as compared with the films of Examples 101 and 110. Thus, it is confirmed that the retardation change after the durability test is suppressed.

(Contact with Organic Solvent)

Of the following organic solvent-contacting steps A and B, those described in Table 1 or 2 are selected to use.

Organic Solvent-Contacting Step A

After completion of the stretching step, the cellulose acylate films are further processed as follows: A coating liquid of the following formulation is applied to the surface of the film which is on the air-interface side thereof in its production (that is, the surface which has not been in contact with the film-forming support) in a coating amount described in Table 1 or 2 using a wire bar coater, then dried under the drying condition described in Table 1 or 2, and is rolled up as a roll of 3900-m film. The roll is weighed to measure the weight $W_1$. Thereafter, the film is dried under the drying condition described in Table 1 or 2 to obtain a cellulose acylate film.

Organic Solvent-Contacting Step B

After completion of the stretching step, the cellulose acylate films are further processed as follows: A coating liquid of the following formulation is applied to the surface of the film which is on the air-interface side thereof in its production (that is, the surface which has not been in contact with the film-forming support) in a coating amount described in Table 1 or 2 using a slot die coater described in FIG. 1 of JP-A-2003-211052, then dried under the drying condition described in Table 1 or 2, and is rolled up as a roll of 3900-m film. The roll is weighed to measure the weight $W_1$. Thereafter, the film is dried under the drying condition described in Table 1 or 2 to obtain a cellulose acylate film.

(Coating Liquid)

Of the following coating liquids A to E, those described in Table 1 or 2 are selected to use.

Coating Liquid A
Acetone/cyclohexane=60/40
Coating Liquid B
Acetone=100
Coating Liquid C
Acetone/cyclohexane=10/90
Coating Liquid D
Methyl ethyl ketone=100
Coating Liquid E
Water 100

(Saponification by Coating)

After completion of the stretching step, the surface of the film which is on the air-interface side thereof in its production (that is, the surface which has not been in contact with the film-forming support) is further subjected to a saponification treatment by coating. In this occasion, after increasing the film surface temperature to 40° C., an alkali solution comprising 5.6 g of potassium hydroxide, 66.1 g of isopropyl alcohol, 15 g of propylene glycol, 1 g of a surfactant ($C_{16}H_{33}O(CH_2CH_2O)_{10}H$), and 13.3 g of water and being kept at 40° C. is applied to the surface in a coating amount of 14 mL/m$^2$ and, after a dwell time of 7 seconds under a 110° C.-heated steam-type infrared heater (manufactured by Noritake Co., Ltd.), pure water is applied to the film in a coating amount of 3 mL/m$^2$ using the same type rod coater to thereby wash away the alkali solution. Further, the film is repeatedly subjected, three times, to washing with water using a fountain coater and hydro-extracting using an air-knife, then allowed to stay in a 70° C. drying zone for 5 seconds to dry, thus a cellulose film being obtained.

(Corona Treatment)

After completion of the stretching step, the surface of the film which is on the air-interface side thereof in its production (that is, the surface which has not been in contact with the film-forming support) is further subjected to corona discharge treatment. In this occasion, the corona discharge output intensity is 750 W, and the integrated irradiation amount is 5 kJ/m$^2$. Thus, a cellulose acylate film is obtained.

(Evaluation of Produced Cellulose Acylate Films)

Each of the thus-obtained cellulose acylate films is performed. Results are shown in the following Table 1 or 2. Additionally, with all the cellulose acylate films in Examples and Comparative Examples, the ratio (Re1/Re0) of retardation (Re1) of the cellulose acylate film after the drying step to the retardation (Re0) of the cellulose acylate film before contacting the organic solvent are within the range of from 0.95 to 1.05. Also, with all the cellulose acylate films in Examples and Comparative Examples, the haze is less than 1.0%. Further, appearance of each cellulose acylate film is visually evaluated, and the results are shown in Table 1.

Further, when each of the cellulose acylate films of Examples 151 and 155 is subjected to the organic solvent-contacting step under the same condition as in Example 113, it is confirmed that both films have such excellent flatness and transparency that they can favorably be used as optical films.

[Criteria for Evaluating Appearance]

A: Having excellent flatness and transparency and being preferably usable as optical film B: Having reduced transparency and curling properties, but being acceptable as optical film C: Having severely reduced transparency and severely curling properties, thus not being usable as optical film <<2>> Production and Evaluation of Polarizing Plate (Production of Polarizing Plate)

1] Saponification of Film

The films produced in Examples, Comparative Examples, and Fujitac TF80UL (by FUJIFILM) are dipped in an aqueous NaOH solution (1.5 mol/L) (saponification solution) conditioned at 55° C. for two minutes, then the films are rinsed with water, then dipped in an aqueous sulfuric acid solution (0.05 mol/L) for 30 seconds, and further allowed to pass through a rinsing bath. Water is removed from them through treatment with an air knife three times and, after water removal, these are left in a drying zone at 70° C. for 15 seconds and dried therein. The process thus gave saponified films.

2] Formation of Polarizer

According to Example 1 in JP-A-2001-141926, a film is stretched in the longitudinal direction between two pairs of nip rolls, thereby giving a polarizer having a thickness of 20 μm.

3] Lamination

The thus-obtained polarizer is combined with any two of the above-saponified films (referred to as film A and film B, respectively). The saponified surface of each film is disposed to face the polarizer. The polarizer is sandwiched between the saponified films and stuck together, using an aqueous 3% PVA solution (PVA-117H; manufactured by Kuraray Co., Ltd.) serving as an adhesive, in such a manner that the polarizing axis can be perpendicular to the longitudinal direction of the film according to a roll-to-roll process thereby giving a polarizing plate. Here, the film A is one selected from the group of films obtained by saponifying the films having been prepared in Examples and Comparative Examples, and the film B is a film obtained by saponifying Fujitac TF80UL.
(Evaluation of Polarizing Plate)
1] Evaluation of Adhesiveness Using a cutter guide having a slit distance of 1 mm, the film is cut to form 100 cross-cuts on its surface. An adhesive tape is stuck to the cut surface of the film, and rubbed with a plastic stick covered one-fold with gauze, whereby they are completely adhered to each other. Next, the adhesive tape is peeled off vertically, and the tape-peeled surface of the film is visually checked. This peeling test is repeated 10 times, the results being shown in Table 1.

Further, polarizing plates using, respectively, the cellulose acylate films of Examples 151 and 155 are prepared and subjected to the same evaluation test. Thus, it is confirmed that both of the polarizers do not suffer peeling.

[Criteria of Evaluating Adhesiveness]
A: No peeling
B: 5% or less peeling
C: 5% or more peeling 2] Initial Degree of Polarization The degree of polarization of the polarizing plate is calculated according to the method mentioned above to find that the degree of polarization of all the polarizing plates is 99.9%.

3] Degree of Polarization after Aging

The polarizing plate is stuck to a glass plate with an adhesive with its film A facing to the glass plate, and left under a condition of 60° C. and a relative humidity of 95% for 500 hours. After being thus left, the degree of polarization of the polarizing plate (degree of polarization after aging) is calculated according to the above-mentioned method to find that the degree of polarization of all the polarizing plates except for films of Comparative Examples 101 and 102 is 99.9%.

TABLE 1

| | Film Formation | | | | Stretching | | Contact with Organic Solvent | | |
|---|---|---|---|---|---|---|---|---|---|
| | Kind of Cellulose Acylate | Kind of Solvent | Kind of Additive | Film-forming Step | Temperature [° C.] | Stretching Ratio [%] | Kind of Coating Liquid | Contacting Step | Coating Amount (mL/m²) |
| Example 101 | A | A | A | A | 180 | 50 | A | A | 10.4 |
| Example 102 | A | A | A | A | 200 | 50 | A | A | 10.4 |
| Example 103 | A | A | A | A | 220 | 50 | A | A | 10.4 |
| Example 104 | A | A | A | A | 180 | 16 | A | A | 10.4 |
| Example 105 | A | A | A | A | 180 | 50 | A | A | 17.3 |
| Example 106 | A | A | A | A | 180 | 50 | A | B | 10.4 |
| Example 107 | A | A | A | A | 180 | 50 | B | A | 10.4 |
| Example 108 | A | A | A | A | 180 | 50 | C | A | 10.4 |
| Example 109 | A | A | A | A | 180 | 50 | D | A | 10.4 |
| Comparative Example 101 | A | A | A | A | 180 | 50 | E | A | 10.4 |
| Example 110 | B | A | A | A | 180 | 50 | A | A | 10.4 |
| Example 111 | B | A | A | A | 185 | 50 | A | A | 10.4 |
| Example 112 | B | A | A | A | 185 | 50 | A | A | 5.2 |
| Example 113 | B | A | A | A | 185 | 50 | A | A | 5.2 |
| Example 114 | B | A | A | A | 185 | 75 | A | A | 5.2 |
| Example 115 | B | A | A | A | 185 | 30 | A | A | 5.2 |
| Example 116 | B | A | A | A | 185 | 50 | A | A | 5.2 |
| Example 117 | B | A | A | A | 185 | 50 | A | A | 2.8 |
| Example 118 | B | A | A | A | 185 | 40 | A | A | 5.2 |
| Example 119 | B | A | A | A | 185 | 40 | A | B | 5.2 |
| Example 120 | C | A | A | A | 180 | 50 | A | A | 10.4 |
| Example 121 | D | A | A | B | 180 | 50 | A | A | 10.4 |
| Example 122 | D | A | A | B | 185 | 50 | A | A | 5.2 |
| Example 123 | D | A | A | B | 185 | 50 | B | A | 2.8 |
| Example 124 | E | A | A | B | 185 | 50 | A | A | 5.2 |
| Example 125 | F | A | A | B | 185 | 50 | A | A | 5.2 |
| Example 126 | G | A | A | B | 180 | 50 | A | A | 10.4 |
| Example 127 | A | A | B | A | 180 | 50 | A | A | 10.4 |
| Example 128 | A | A | A | A | 180 | 50 | A | A | 10.4 |
| Example 129 | A | A | A | B | 180 | 50 | A | A | 10.4 |
| Comparative Example 102 | A | A | A | A | 180 | 50 | (No contact) | | |
| Comparative Example 103 | A | A | A | A | 180 | 50 | (Saponification treatment by coating) | | |
| Comparative Example 104 | A | A | A | A | 180 | 50 | (Corona treatment) | | |
| Comparative Example 105 | A | A | A | A | 180 | 50 | B | A | 17.3 |

| | Contact with Organic Solvent | | | Orientation Degree | | | | | |
|---|---|---|---|---|---|---|---|---|---|
| | Drying Temperature [° C.] | Drying Time [sec] | Weight Ratio W1/W0 | I12/I11 0 to 3 μm [—] | I22/I21 3 to 10 μm [—] | \|I22/I21\|/ \|I12/I11\| | Surface Roughness [nm] | Surface State [—] | Adhesiveness [—] |
| Example 101 | 70 | 120 | 1.00 | 1.01 | 1.21 | 1.20 | 5.6 | A | A |
| Example 102 | 70 | 120 | 1.00 | 1.01 | 1.21 | 1.20 | 5.3 | A | A |
| Example 103 | 70 | 120 | 1.00 | 1.01 | 1.23 | 1.22 | 5.0 | A | A |
| Example 104 | 70 | 120 | 1.00 | 1.01 | 1.09 | 1.08 | 5.5 | A | A |
| Example 105 | 70 | 120 | 1.00 | 1.01 | 1.19 | 1.18 | 5.8 | A | A |

TABLE 1-continued

| | | | | | | | | | |
|---|---|---|---|---|---|---|---|---|---|
| Example 106 | 70 | 120 | 1.00 | 1.01 | 1.20 | 1.19 | 5.3 | A | A |
| Example 107 | 70 | 120 | 1.00 | 1.00 | 1.21 | 1.21 | 5.4 | B | A |
| Example 108 | 70 | 120 | 1.00 | 1.10 | 1.21 | 1.10 | 5.5 | B | A |
| Example 109 | 70 | 120 | 1.00 | 1.16 | 1.21 | 1.04 | 5.4 | A | B |
| Comparative Example 101 | 70 | 120 | 1.00 | 1.21 | 1.21 | 1.00 | 3.3 | A | C |
| Example 110 | 70 | 120 | 1.00 | 1.00 | 1.21 | 1.21 | 9.0 | A | A |
| Example 111 | 70 | 120 | 1.00 | 1.01 | 1.19 | 1.18 | 8.9 | A | A |
| Example 112 | 100 | 120 | 1.00 | 1.01 | 1.19 | 1.18 | 12.0 | A | A |
| Example 113 | 120 | 120 | 1.00 | 1.01 | 1.19 | 1.18 | 12.1 | A | A |
| Example 114 | 120 | 120 | 1.00 | 1.01 | 1.41 | 1.40 | 13.0 | A | B |
| Example 115 | 120 | 120 | 1.00 | 1.00 | 1.12 | 1.12 | 11.8 | A | A |
| Example 116 | 120 | 90 | 1.00 | 1.01 | 1.19 | 1.18 | 12.2 | A | A |
| Example 117 | 120 | 90 | 1.00 | 1.01 | 1.19 | 1.18 | 13.5 | B | A |
| Example 118 | 120 | 90 | 1.00 | 1.01 | 1.16 | 1.15 | 12.1 | A | A |
| Example 119 | 120 | 90 | 1.00 | 1.00 | 1.16 | 1.16 | 11.9 | A | A |
| Example 120 | 70 | 120 | 1.00 | 1.00 | 1.20 | 1.20 | 5.2 | A | A |
| Example 121 | 70 | 120 | 1.00 | 1.01 | 1.19 | 1.18 | 13.2 | B | A |
| Example 122 | 120 | 90 | 1.00 | 1.00 | 1.19 | 1.19 | 14.7 | B | A |
| Example 123 | 120 | 90 | 1.00 | 1.00 | 1.19 | 1.19 | 8.6 | A | A |
| Example 124 | 120 | 90 | 1.00 | 1.00 | 1.18 | 1.18 | 18.2 | B | A |
| Example 125 | 120 | 90 | 1.00 | 1.00 | 1.17 | 1.17 | 25.7 | B | A |
| Example 126 | 70 | 120 | 1.00 | 1.01 | 1.18 | 1.17 | 7.3 | A | A |
| Example 127 | 70 | 120 | 1.00 | 1.01 | 1.21 | 1.20 | 5.8 | A | A |
| Example 128 | 70 | 120 | 1.00 | 1.01 | 1.21 | 1.27 | 7.1 | A | A |
| Example 129 | 70 | 120 | 1.00 | 1.01 | 1.27 | 1.26 | 7.3 | A | A |
| Comparative Example 102 | (No contact) | | | 1.23 | 1.21 | 0.98 | 2.7 | A | C |
| Comparative Example 103 | (Saponification treatment by coating) | | | 1.21 | 1.21 | 1.00 | 3.6 | A | C |
| Comparative Example 104 | (Corona treatment) | | | 1.21 | 1.21 | 1.00 | 4.5 | A | C |
| Comparative Example 105 | 25 | 180 | 1.00 | 1.01 | 1.01 | 1.00 | 5.7 | C | A |

TABLE 2

| | Film Formation | | | | Stretching | | Contact with Organic Solvent |
|---|---|---|---|---|---|---|---|
| | Kind of Cellulose Acylate | Kind of Solvent | Kind of Additive | Film-forming Step | Temperature [° C.] | Stretching Ratio [%] | Kind of Coating Liquid |
| Example 101 | A | A | A | A | 180 | 50 | A |
| Example 104 | A | A | A | A | 180 | 16 | A |
| Example 105 | A | A | A | A | 180 | 50 | A |
| Example 106 | A | A | A | A | 180 | 50 | A |
| Example 107 | A | A | A | A | 180 | 50 | B |
| Example 131 | B | A | C | A | 185 | 35 | A |
| Example 132 | B | A | C | A | 185 | 35 | A |
| Example 133 | B | A | C | A | 185 | 35 | A |
| Comparative Example 102 | A | A | A | A | 180 | 50 | (No contact) |
| Comparative Example 105 | A | A | A | A | 180 | 50 | B |

| | Contact with Organic Solvent | | | | | | |
|---|---|---|---|---|---|---|---|
| | Contacting Step | Coating Amount (mL/m$^2$) | Drying Temperature [° C.] | Drying Time [sec] | Re [nm] | Rth [nm] | Change in Re Re1/Re0 [—] |
| Example 101 | A | 10.4 | 70 | 120 | 64 | 220 | 0.98 |
| Example 104 | A | 10.4 | 70 | 120 | 29 | 237 | 1.00 |
| Example 105 | A | 17.3 | 70 | 120 | 64 | 221 | 0.98 |
| Example 106 | A | 10.4 | 70 | 120 | 64 | 220 | 0.98 |
| Example 107 | A | 10.4 | 70 | 120 | 61 | 222 | 0.94 |
| Example 131 | A | 5.2 | 120 | 90 | 70 | 212 | 0.99 |
| Example 132 | B | 5.2 | 120 | 90 | 70 | 212 | 0.99 |
| Example 133 | A | 2.8 | 120 | 90 | 71 | 211 | 1.00 |
| Comparative Example 102 | (No contact) | | | | 65 | 216 | — |
| Comparative Example 105 | A | 17.3 | 25 | 180 | 51 | 233 | 0.78 |

As is shown in Tables 1 and 2, the cellulose acylate films of the invention wherein the in-plane orientation of the portion of from 0 to 3 μm from the surface is less than the in-plane orientation of the film portion of from 3 to 10 μn have excellent adhesiveness. On the other band, the cellulose acylate film outside the scope of the invention wherein the in-plane orientation of the film portion of from 0 to 3 μm from the surface is not reduced have insufficient adhesiveness (Comparative Examples 101 to 104). In addition, the film wherein the in-plane orientation of the portion of from 3 to 10 μm from the surface is also reduced, the film has deteriorated surface state, though having excellent adhesiveness (Comparative Example 105). Specifically, though wrinkle-like waviness and bleeding are not observed, severe curling is confirmed across the full width of the film. In addition, in Comparative Example 105, although Re before the organic solvent-contacting step is 65 nM, Re after the organic solvent-contacting step is reduced as low as 51 nm.

The cellulose acylate films produced according to the production method of the invention have good surface state, excellent adhesiveness to the polarizer, and low haze. On the other hand, in the case of contacting with other substances than the organic solvent as in Comparative Example 101 and in the case of not contacting with any organic solvent as in Comparative Example 102, the resulting films have insufficient adhesiveness and show a reduced polarization degree when aged.

Further, when Example 117 is performed in absolutely the same manner except for using cellulose acylate H in place of cellulose acylate B used in Example 117, the resulting film has an orientation degree within the scope of the invention, and is found to have excellent surface state and adhesiveness. Also, in the case of using cellulose acylate I and cellulose acylate J, the same evaluation is performed except for changing the concentration of the sodium hydroxide aqueous solution used in the step of "saponification of film" from 1.5 mol/L to 4.5 mol/L to find that the films have an excellent orientation degree, excellent surface state, and excellent adhesiveness.

<<3-1>> Evaluation (1) in Mounting on VA-Mode Liquid Crystal Display Device

Polarizing plates sandwiching a liquid crystal cell mounted in a marketed liquid crystal TV set (VA-mode, 40-inch liquid crystal TV set, KDL-40J5000; manufactured by Sony Corporation) are peeled away, and polarizing plates prepared by using the cellulose acylate films of Examples 101, 104, 132, or Comparative Example 102 are re-stuck to the liquid crystal cell. When the re-assembled liquid crystal TV set is viewed in the oblique direction, the polarizing plates using the films of Examples 101, 132, and Comparative Example 102 cause no light leakage and provide good visibility but, with the polarizing plate using the film of Example 104, light leakage is visually observed.

Additionally, when the front luminance of the liquid crystal TV set having the re-stuck liquid crystal cell measured by a luminance meter in a black display state is higher than the luminance before peeling the polarizing plates, the work of peeling the polarizing plates from the liquid crystal cell is performed before the visual evaluation in the oblique direction. In this occasion, the polarizing plates using the films of Examples 101 and 104 can be peeled with no problems, but the polarizing plates using the film of Comparative Example 102 undergo cracking many times, and it takes 10 times as much as the time required for peeling the polarizing plates of Example 101 to peel the polarizing plates using the film of Comparative Example 102.

<<3-2>> Evaluation (2) in Mounting on VA-Mode Liquid Crystal Display Device

Polarizing plates sandwiching a liquid crystal cell mounted in a marketed liquid crystal TV set (VA-mode, 32-inch liquid crystal TV set) are peeled away, and polarizing plates prepared by using the cellulose acylate films of Examples 101 or Comparative Example 101 are re-stuck to the liquid crystal cell. The re-assembled liquid crystal TV set is left in a thermo-hygrostat with temperature of 80° C. and relative humidity of 95% for 24 hours, then left in a thermo-hygrostat with temperature of 20° C. and relative humidity of 40% for 24 hours, with these procedures being repeated 20 times. Visual observation of the lamination state between the cellulose acylate film and the polarizer reveals that, with the polarizing plates using the film of Example 101, the length of a portion appearing white due to peeling is less than 1 mm but, with the polarizing plates using the film of Comparative Example 101, the length of a portion appearing white due to peeling is 1 mm or longer.

What is claimed is:

1. A cellulose acylate film having a surface, wherein:
a first in-plane orientation $I_{12}/I_{11}$ in a portion from 0 to 3 μm in depth from the surface is lower than a second in-plane orientation $I_{22}/I_{21}$ in a portion from 3 μm to 10 μm in depth from the surface, wherein a ratio $|I_{22}/I_{21}|/|I_{12}/I_{11}|$ is from 1.05 to 1.80,
wherein $I_{11}$ and $I_{21}$ represent an area when a polarized light in an in-plane slow axis direction is introduced into the film, and $I_{12}$ and $I_{22}$ represent an area when a polarized light perpendicular to a polarized light in an in-plane slow axis direction is introduced into the film;
wherein the film satisfies formulae (I) and (II):

$30 \leq Re \leq 85$  Formula (I)

$80 \leq Rth \leq 300$  Formula (II)

wherein Re represents an in-plane retardation value in nm, and Rth represents a thickness-direction retardation,
wherein the first in-plane orientation $I_{12}/I_{11}$ of the cellulose acylate film at the portion from 0 to 3 μm in depth from the surface is determined by: cutting the film from a side opposite to a side to be measured to a film thickness of 3 μm from a surface to be measured, to thereby prepare a sample; introducing a polarized light into the film using a Fourier Transform Infrared Spectrophotometer; and measuring an absorption peak area of a transmission spectrum in the vicinity of 1750 $cm^{-1}$, and
wherein the in-plane orientation $I_{22}/I_{21}$ of the film in the portion from 3 to 10 μm in depth from the surface is determined by cutting the film to a depth of 3 μm from a measured surface and cutting from an opposite side of the measured surface to a thickness of 7 μm to prepare a sample.

2. The cellulose acylate film according to claim 1, wherein the surface has a surface roughness of 5 to 300 nm.

3. A retardation film comprising at least one cellulose acylate film according to claim 1.

4. A polarizing plate comprising at least one cellulose acylate film according to claim 1.

5. A liquid crystal display device comprising at least one cellulose acylate film according to claim 1.

* * * * *